(12) United States Patent
Chen et al.

(10) Patent No.: US 11,671,329 B2
(45) Date of Patent: Jun. 6, 2023

(54) COMPUTATION OF NETWORK FLOODING TOPOLOGIES

(71) Applicant: Arista Networks, Inc., Santa Clara, CA (US)

(72) Inventors: Yunxia Chen, San Jose, CA (US); Anthony Joseph Li, Los Altos, CA (US)

(73) Assignee: Arista Networks, Inc., Santa Monica, CA (US)

( * ) Notice: Subject to any disclaimer, the term of this patent is extended or adjusted under 35 U.S.C. 154(b) by 0 days.

(21) Appl. No.: 16/752,245

(22) Filed: Jan. 24, 2020

(65) Prior Publication Data
US 2020/0162335 A1    May 21, 2020

Related U.S. Application Data

(63) Continuation-in-part of application No. 15/945,038, filed on Apr. 4, 2018, now Pat. No. 11,102,106.

(51) Int. Cl.
*H04L 41/12* (2022.01)
*H04L 12/44* (2006.01)
*H04L 41/22* (2022.01)
*H04L 41/082* (2022.01)
*H04L 43/16* (2022.01)

(52) U.S. Cl.
CPC .............. *H04L 41/12* (2013.01); *H04L 12/44* (2013.01); *H04L 41/082* (2013.01); *H04L 41/22* (2013.01); *H04L 43/16* (2013.01)

(58) Field of Classification Search
CPC ....... H04L 41/12; H04L 41/082; H04L 41/22; H04L 12/44; H04L 43/16; H04L 45/028; H04L 45/44; H04L 45/28; H04L 45/02; H04L 45/00; H04L 45/48; H04L 45/32; H04L 45/123; H04L 45/12; H04L 45/122;
(Continued)

(56) References Cited

U.S. PATENT DOCUMENTS 6,349,091 B1  2/2002 Li
7,177,951 B1  2/2007 Dykeman et al.
(Continued)

FOREIGN PATENT DOCUMENTS

EP    3400678    11/2018

OTHER PUBLICATIONS

International Search Report and Written Opinion issued in corresponding Application No. PCT/US2019/037815, dated Jul. 26, 2019 (17 pages).
(Continued)

*Primary Examiner* — Sudesh M Patidar
(74) *Attorney, Agent, or Firm* — Sprinkle IP Law Group

(57) ABSTRACT

Techniques described herein relate to a method for computation of network flooding topologies. A flooding topology may refer to a subset of a network which can be utilized by a network device to limit the flooding of link state updates. The flooding topology may be determined by an area leader (i.e., a designated network device) of the network. Computation of the flooding topology may entail the iterative incorporation (or absorption) of nodes and edges of a first connected graph, representing network devices and interconnections of a network topology of the network, into a second connected graph representing the flooding topology.

14 Claims, 13 Drawing Sheets

(58) Field of Classification Search
CPC ....... H04L 45/126; H04L 47/10; H04L 47/12; H04L 47/125; H04L 47/17; H04L 49/201
See application file for complete search history.

(56) References Cited

U.S. PATENT DOCUMENTS

| | | | |
|---|---|---|---|
| 7,281,057 B2 | 10/2007 | Cain | |
| 8,214,447 B2 | 7/2012 | Deslippe | |
| 8,826,032 B1 | 9/2014 | Yahalom et al. | |
| 8,917,708 B2 | 12/2014 | Venkatachalam et al. | |
| 8,995,303 B1 | 3/2015 | Brar | |
| 9,042,263 B1 | 5/2015 | Yahalom et al. | |
| 9,253,663 B2 | 2/2016 | Raleigh | |
| 9,491,089 B2 | 11/2016 | Bhatt | |
| 9,584,363 B1 | 2/2017 | Olson | |
| 9,674,193 B1 | 6/2017 | Madasamy | |
| 9,712,390 B2 | 7/2017 | Lissack | |
| 9,760,598 B1 | 9/2017 | Holenstein | |
| 9,984,140 B1 | 5/2018 | Sukumaran | |
| 10,218,610 B2 | 2/2019 | Frost et al. | |
| 10,379,890 B1 | 8/2019 | Mehta et al. | |
| 10,425,290 B1 | 9/2019 | Oren et al. | |
| 10,469,360 B1 | 11/2019 | Bhat et al. | |
| 10,623,285 B1 | 4/2020 | Shevade | |
| 11,277,329 B2 | 3/2022 | Chen | |
| 11,489,766 B2 | 11/2022 | Chen | |
| 2003/0115364 A1 | 6/2003 | Shu et al. | |
| 2003/0179707 A1* | 9/2003 | Bare | H04L 45/245 370/235 |
| 2004/0143425 A1 | 7/2004 | Rosenberg | |
| 2005/0036500 A1* | 2/2005 | Rodeheffer | H04L 12/462 370/401 |
| 2005/0041676 A1* | 2/2005 | Weinstein | H04L 45/48 370/401 |
| 2005/0170852 A1 | 8/2005 | Li et al. | |
| 2005/0265260 A1 | 12/2005 | Zinin et al. | |
| 2007/0070920 A1 | 3/2007 | Oyamada | |
| 2007/0088763 A1 | 4/2007 | Yahalom et al. | |
| 2007/0124375 A1 | 5/2007 | Vasudevan | |
| 2007/0280102 A1 | 12/2007 | Vasseur et al. | |
| 2009/0144443 A1 | 6/2009 | Vasseur et al. | |
| 2009/0158387 A1 | 6/2009 | Huang | |
| 2009/0245137 A1 | 10/2009 | Hares et al. | |
| 2010/0057563 A1 | 3/2010 | Rauber | |
| 2010/0103846 A1 | 4/2010 | Chiabaut et al. | |
| 2010/0205392 A1 | 8/2010 | Schnapp et al. | |
| 2010/0296414 A1 | 11/2010 | Vohra | |
| 2011/0116369 A1 | 5/2011 | Hu et al. | |
| 2012/0087304 A1 | 4/2012 | Porat | |
| 2012/0201539 A1* | 8/2012 | Boertjes | H04J 14/0268 398/51 |
| 2012/0239793 A1 | 9/2012 | Veerabhadrappa | |
| 2012/0294187 A1 | 11/2012 | Chau et al. | |
| 2013/0077621 A1 | 3/2013 | Jacob Da Silva et al. | |
| 2013/0121156 A1* | 5/2013 | Rege | H04L 45/026 370/238 |
| 2013/0136138 A1 | 5/2013 | Miller et al. | |
| 2013/0145461 A1 | 6/2013 | Barton | |
| 2013/0173876 A1 | 7/2013 | Namjoshi | |
| 2013/0311229 A1 | 11/2013 | Hadar | |
| 2014/0010069 A1 | 1/2014 | Abbasi et al. | |
| 2014/0043956 A1 | 2/2014 | Mirtorabi et al. | |
| 2014/0219103 A1* | 8/2014 | Vasseur | H04L 45/125 370/237 |
| 2014/0233422 A1* | 8/2014 | Thubert | H04L 45/16 370/254 |
| 2014/0269421 A1 | 9/2014 | Previdi et al. | |
| 2014/0269725 A1 | 9/2014 | Filsfils | |
| 2015/0055652 A1* | 2/2015 | Yong | H04L 12/185 370/390 |
| 2015/0127789 A1 | 5/2015 | Lissack | |
| 2015/0188760 A1 | 7/2015 | Anumala et al. | |
| 2015/0350314 A1 | 12/2015 | Miller et al. | |
| 2016/0027292 A1 | 1/2016 | Kerning | |
| 2016/0134482 A1 | 5/2016 | Beshai | |
| 2016/0164716 A1 | 6/2016 | Dusi | |
| 2016/0248656 A1 | 8/2016 | Anand | |
| 2016/0248658 A1 | 8/2016 | Patel et al. | |
| 2017/0195218 A1* | 7/2017 | Schrum, Jr. | H04L 45/02 |
| 2017/0201451 A1* | 7/2017 | Allan | H04L 65/4076 |
| 2017/0353360 A1 | 12/2017 | Hayashitani | |
| 2018/0041360 A1 | 2/2018 | Shen et al. | |
| 2018/0176082 A1 | 6/2018 | Katz et al. | |
| 2018/0176093 A1 | 6/2018 | Katz et al. | |
| 2019/0104061 A1 | 4/2019 | Zhang et al. | |
| 2019/0329768 A1* | 10/2019 | Shalev-Shwartz | B60W 30/0956 |
| 2021/0119910 A1* | 4/2021 | Chen | H04L 45/02 |
| 2022/0094632 A1 | 3/2022 | Chen | |
| 2022/0131790 A1 | 4/2022 | Chen | |
| 2022/0272024 A1 | 8/2022 | Chen | |

OTHER PUBLICATIONS

J. Moy; "OSPF Version 2"; STD 54, RFC 2328; DOI 10.17487/RFC2328, Apr. 1998; https://tools.ietf.org/html/rfc2328.

N. Shen et al.; "IS-IS Routing for Spine-Leaf Topology"; Internet Draft, Networking Working Group; Jan. 2, 2018; XP015124979.

R. Coltun et al.; "OSPF for IPv6"; RFC 5340; DOI 10.17487/RFC5340, Jul. 2008; https://tools.ietf.org/html/rfc5340.

"Information technology—Telecommunications and information exchange between systems—Intermediate System to Intermediate System intra-domain routeing information exchange protocol for use in conjunction with the protocol for providing the connectionless-mode network service (ISO 8473)"; ISO/IEC 10589:2002(E); 2002 (210 pages).

C. Filsfils et al.; "Segment Routing Architecture, draft-ietf-spring-segment-routing-13" Oct. 2017; https://tools.ietf.org/id/draft-ietf-spring-segment-routing-13.html (22 pages).

T. Li; "Dynamic Flooding on Dense Graphs, draft-li-dynamic-flooding-04"; JMar. 2018; https://tools.ietf.org/html/draft-i-dynamic-flooding-04 (18 pages).

Chen Futurewei et al., Flooding Topology Computation Algorithm, Flooding Topology Computation Algorithm, Jul. 8, 2019, 1-9, 2019.

Chen T Li Arista Networks, An Algorithm for Computing Dynamic Flooding Topologies, An Algorithm for Computing Dynamic Flooding Topologies, Mar. 3, 2020, 1-9, 2020.

Frank R et al., EDFS A Novel Flooding Protocol for Multi-Hop Wireless Networks, EDFS A Novel Flooding Protocol for Multi-Hop Wireless Networks, Feb. 3, 2010, 99-105, 2010.

Li T et al., Dynamic Flooding on Dense Graphs, Dynamic Flooding on Dense Graphs, Nov. 26, 2019, 1-47, 2019.

Allen, Dave, A Distributed Algorithm for Constrained Flooding of IGP Advertisements, Ericsson, Santa Clara, CA, Oct. 2018, 15 pgs.

\* cited by examiner

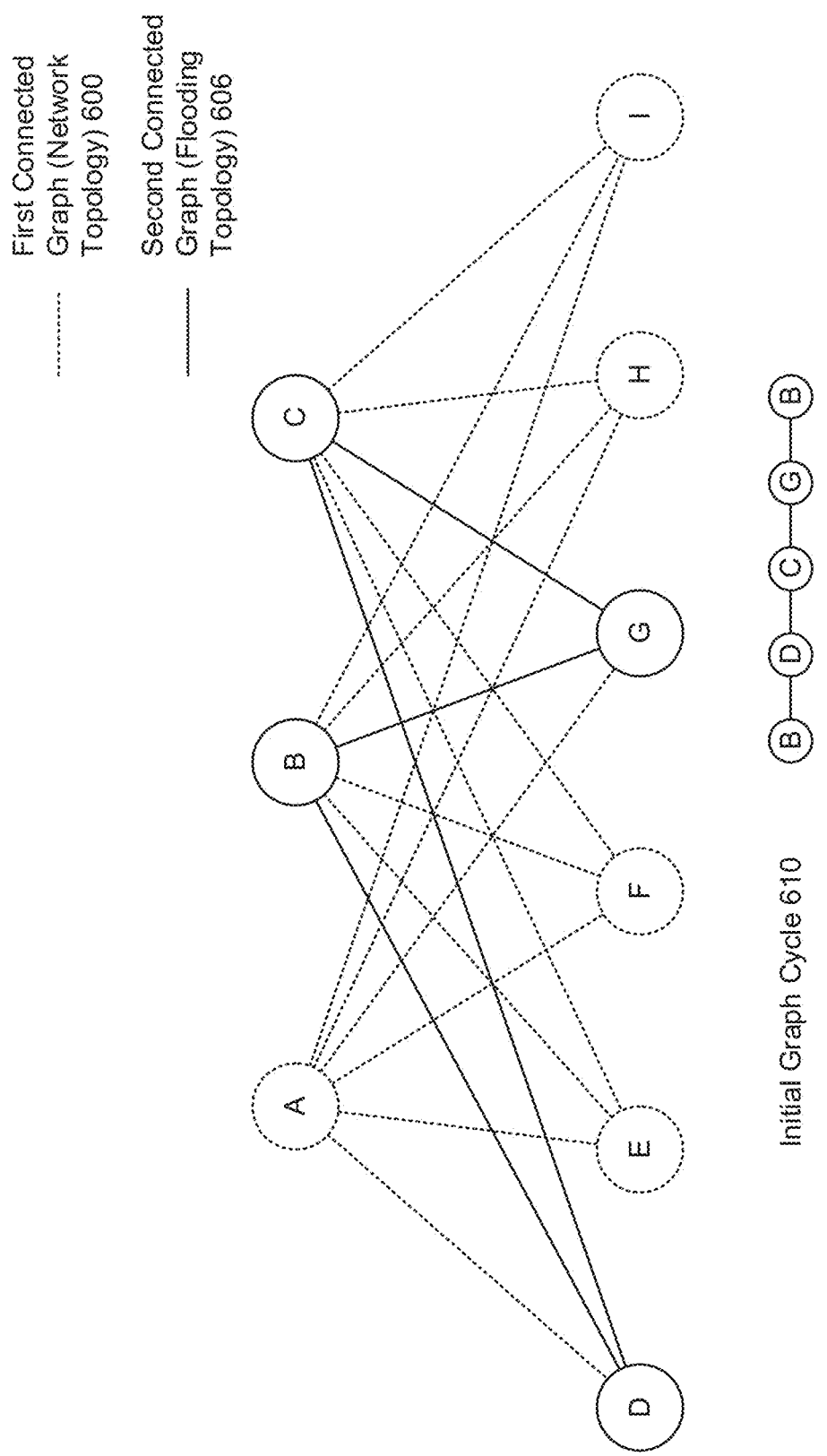

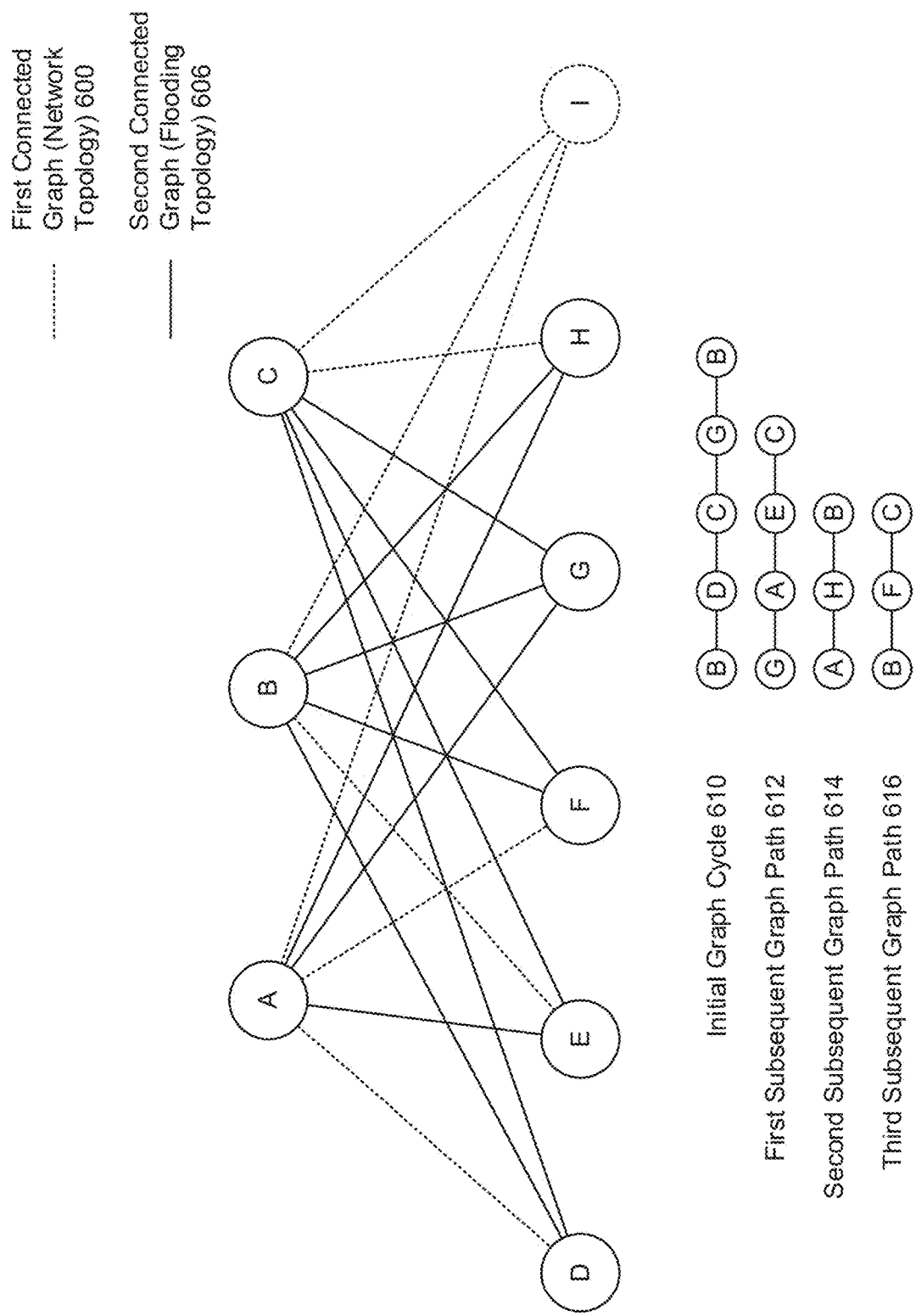

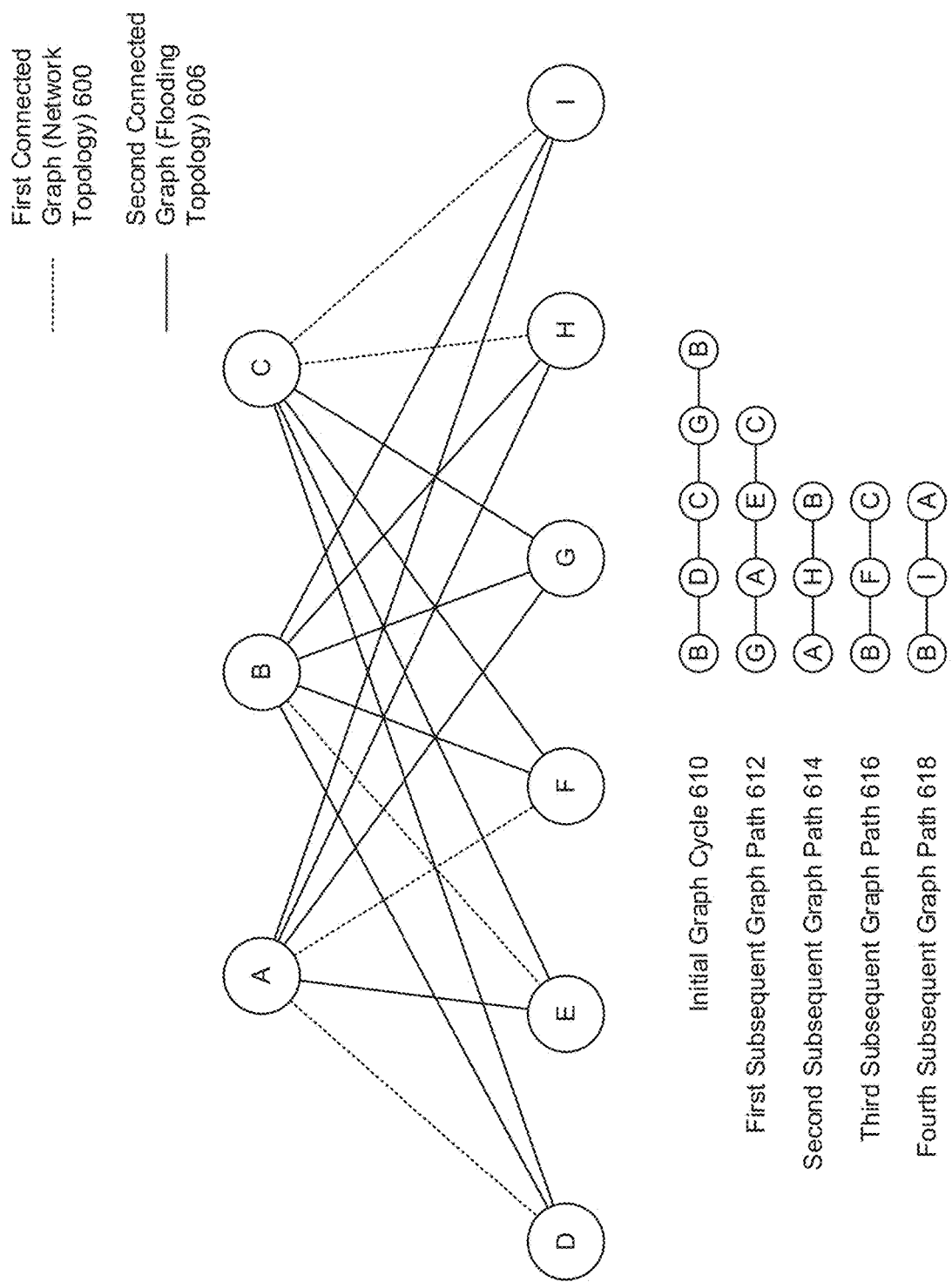

COMPUTATION OF NETWORK FLOODING TOPOLOGIES

CROSS-REFERENCE TO RELATED APPLICATIONS

This application is a continuation-in-part of U.S. patent application Ser. No. 15/945,038, filed on Apr. 4, 2018, and entitled: "DYNAMIC FLOODING FOR LINK STATE PROTOCOLS". Accordingly, this application claims benefit of U.S. patent application Ser. No. 15/945,038 under 35 U.S.C. § 120, which is hereby incorporated by reference in its entirety.

BACKGROUND

Networks of interconnected devices (e.g., computer networks) often include any number of network devices. Such network devices may be arranged in a network topology in order to provide connectivity between devices within and outside of the network. Within such network topologies, routing protocols are often implemented that distribute certain information, at least in part, by flooding the information (e.g., in packets) from each network device in the topology to all directly connected network devices. Such flooding may be redundant, and, as such, may lead to reduced or sub-optimal performance of the network topology and/or one or more network devices within the network topology.

BRIEF DESCRIPTION OF DRAWINGS

FIGS. 6A-6H show an exemplary derivation of a flooding topology from a network topology in accordance with one or more embodiments described herein.

DETAILED DESCRIPTION

Figure 1:
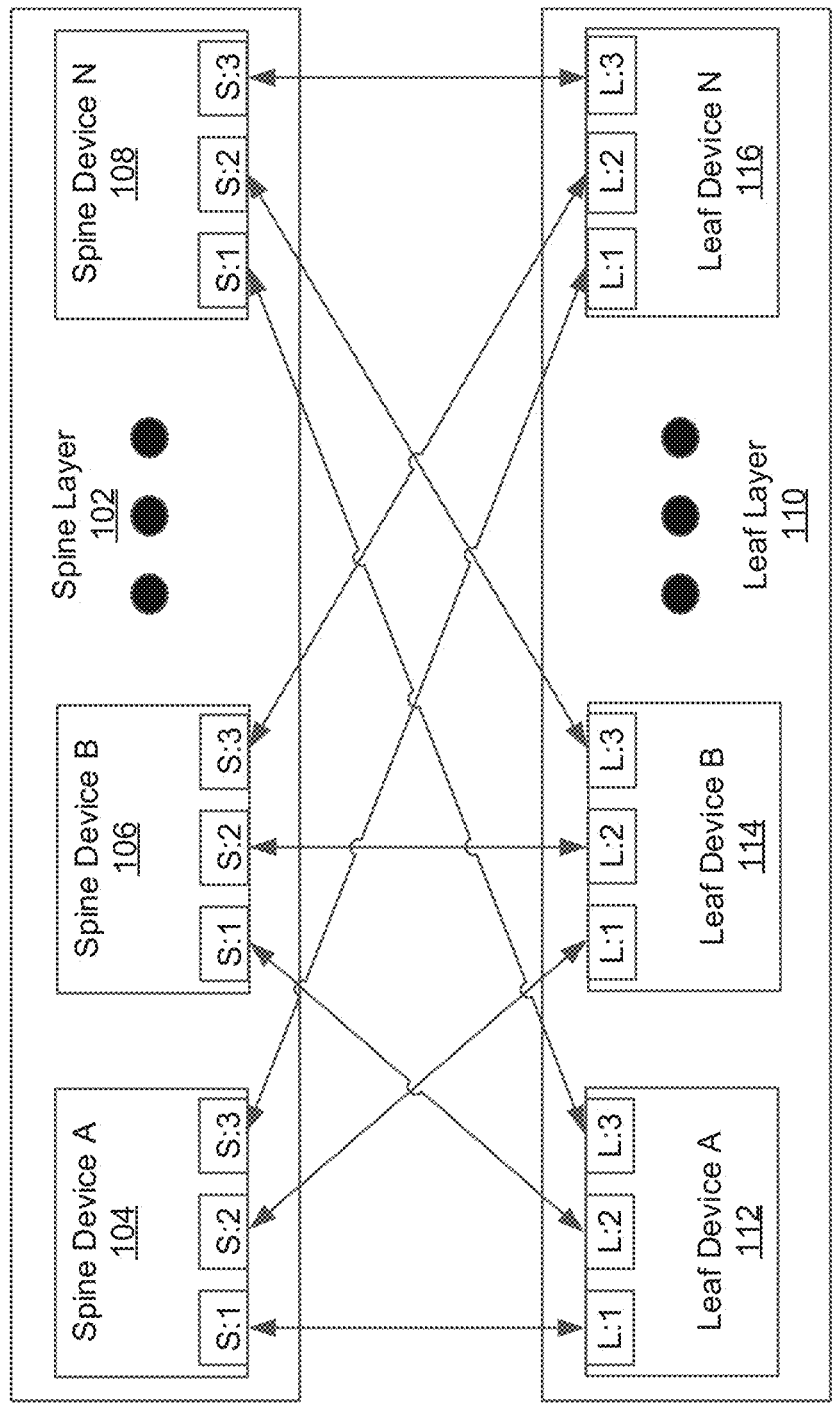
FIG. 1 shows a network topology in accordance with one or more embodiments described herein.

Specific embodiments will now be described in detail with reference to the accompanying figures.

In general, embodiments described herein relate to the computation of network flooding topologies. A flooding topology may refer to a subset of a network, which may be derived or calculated by an area leader (i.e., a designated network device) of the network. Computation of the flooding topology may entail the iterative incorporation (or absorption) of nodes and edges of a first connected graph, representing network devices and interconnections of a network topology of the network, into a second connected graph representing the flooding topology.

In one or more embodiments, any computed flooding topology should exhibit at least the following properties: (a) the flooding topology must include all nodes of a network topology of the network, thereby facilitating the distribution of the link state updates throughout the entirety of the network; (b) the flooding topology must be bi-connected, thereby safeguarding the flooding topology from single-point failures; (c) the flooding topology should be bound by a given diameter (i.e., a longest of all the calculated shortest paths in the network) limitation in order to minimize link state update dissemination latency; and (d) the flooding topology should be bound by a given node degree (i.e., a number of connections or edges any node has to other nodes) limitation in order to balance the link state update dissemination load evenly across the nodes (or network devices) of the network.

In one or more embodiments, the properties of node coverage, bi-connectivity, limited diameter, and bounded degree are all achieved simultaneously. Node coverage is a necessity for the correct operation of the link state protocol. Bi-connectivity is advantageous because it makes the flooding topology immune to single link or single node failures. In practice, almost all failures are of a single link or node. With a bi-connected flooding topology, the area leader can re-compute the flooding topology and distribute it on the existing flooding topology in a non-disruptive fashion, without resorting to partition repair. By limiting the diameter of the flooding topology, the algorithm helps to ensure that the convergence time of the link state protocol is preserved. If the diameter of the flooding topology is large, then the latency involved in flooding can become the dominating factor in the protocol convergence time and hinder the prompt rerouting of the network when there is a failure. Bounding the node degree of the flooding topology ensures that the work is as evenly distributed as possible within the flooding topology, avoiding giving an undue workload to any node and thereby maximizing the scalability of the network.

In one or more embodiments, the computation (or derivation) of the flooding topology may be performed in a constructive manner while creating and preserving the four essential properties described above. Further, the computation may be performed in an efficient fashion and can be derived from an arbitrary network topology.

In accordance with various embodiments, derivation of the flooding topology of a network may entail starting with a first connected graph representing the network topology of the network, which may be conveyed using a set of nodes (i.e., each representative of a network device on the network) interconnected by a set of edges (i.e., each representing a connection on the network between a pair of network devices). Next, a node of the set of nodes may be selected to serve as a root node, which may be employed to initialize a second connected graph representing the flooding topology. The root node may represent a node of the set of nodes having the highest node degree (also referred to as the largest node degree) across the first connected graph. Subsequently, expanding outwardly from the root node, the second connected graph (i.e., flooding topology) may be built-up iteratively through the traversal of the first connected graph to identify an initial graph cycle and a finite set of graph paths. The initial graph cycle may encompass a linked collection of nodes starting from and ending on the root node, and connected by a non-repetitive subset of the set of edges, where the linked collection of nodes include the root node and a non-repetitive subset of the set of nodes (excluding the root node and each excluded from the second connected graph). Meanwhile, each graph path may encompass a linked collection of nodes starting from a first node and ending on a second node (both excluded from the second connected graph), and connected by a non-repetitive subset of the set of edges, where the linked collection of nodes includes the first node, the second node, and a non-repetitive subset of the set of nodes (each not included in the second connected graph).

Further, in various embodiments, the identification of the initial graph cycle and each graph path may entail two traversing stages: (a) an outward traversal stage, which may encompass traversing the first connected graph outwardly from the starting node using a depth first search (DFS) algorithm; and (b) an inward traversal stage, which may alternatively encompass traversing the connected graph inwardly back to the ending node using a breadth first search (BFS) algorithm. The aforementioned starting node, pertinent to the initial graph cycle, may be represented by the root node; or, alternatively, may be represented by a first node of a first pair of adjacent nodes (also including a second node) on the first connected graph for a given graph path. The aforementioned ending node, pertinent to the initial graph cycle, may be represented by the root node; or, alternatively, may be represented by a third node of a second pair of adjacent nodes (also including a fourth node) on the first connected graph for a given graph path. Concerning the graph path cases, the first and third nodes of the first and second pairs of adjacent nodes should not be part of the second connected graph at the time of selection, while the second and fourth nodes of the first and second pairs of adjacent nodes should be part of the second connected graph at the time of selection. Moreover, following the identification of the initial graph cycle and each graph path, the second connected graph may be updated using the initial graph cycle and each graph path, thereby adding a subset of nodes and a subset of edges to the second connected graph iteratively. Derivation of the flooding topology may end when the second connected graph has absorbed the initial graph cycle and as many graph paths (e.g., the set of graph paths) as it takes for the second connected graph to include the entirety of the set of nodes on the first connected graph. The final second connected graph subsequently includes all the nodes of the first connected graph, however, only exhibits a subset of the edges interconnecting the nodes of the first connected graph In the following detailed description, numerous specific details are set forth in order to provide a more thorough understanding of the various embodiments. However, it will be apparent to one of ordinary skill in the art that the various embodiments may be practiced without these specific details. In other instances, well-known features have not been described in detail to avoid unnecessarily complicating the description.

In the following description of FIGS. 1-6H, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connecting the operatively connected components) connection.

FIG. 1 shows a network topology in accordance with one or more embodiments. As shown in FIG. 1, the network topology (100) includes a spine layer (102) and a leaf layer (110). The spine layer (102) may include any number of spine devices, such as spine device A (104), spine device B (106), and spine device N (108). The leaf layer (110) may include any number of leaf devices, such as leaf device A (112), leaf device B (114), and leaf device N (116). Each of these components is described below.

In one or more embodiments, a network topology (100) is an arrangement of various elements of a network. In one or more embodiments, a network includes a collection of one or more network devices (e.g., spine devices (104, 106, 108), leaf devices (112, 114, 116)) that facilitate network connectivity for one or more operatively connected devices (e.g., computing devices, data storage devices, etc.). As used herein, the term operatively connected, or operative connection, means that there exists between elements/components a direct or indirect connection that allows the elements to interact with one another in some way. For example, such elements may exchange information, send instructions to perform actions, cause changes in state and/or operating condition, etc. Additionally, as used herein, a network may be an entire network or any portion thereof (e.g., a logical area of network devices within the network topology). A network may include a datacenter network, a wide area network, a local area network, a wireless network, a cellular phone network, or any other suitable network that facilitates the exchange of information from one part of the network to another. In one embodiment, the network may be coupled with or overlap, at least in part, with the Internet.

In one embodiment, the network topology (100) is a bipartite network topology. In one or more embodiments, a bipartite network topology is a network topology in which there are at least two sets of network devices, with connections between devices of one set and devices of another set, but no connections between devices within a given set. Examples of such network topologies include, but are not limited to, a folded three-stage Clos network topology, a fat tree topology (i.e., Leiserson topology), and a spine-leaf topology. In one or more embodiments, such network topologies may be referred to as dense network topologies. In one or more embodiments, a dense network topology is a network topology in which the network devices are highly interconnected, with, as an example, each device in a first set of network devices being connected to each device in a second set of network devices within the network topology. In the exemplary embodiment shown in FIG. 1, the network topology (100) is a spine-leaf topology. Although, FIG. 1 shows an example of a spine-leaf topology, in one or more embodiments, the network topology is not limited to being a spine-leaf topology (or the particular example shown), or any other example of a dense network topology set forth herein.

In one or more embodiments, when a network topology (100) is arranged as a spine-leaf topology, the network topology (100) includes a leaf layer (110) and a spine layer (102).

In one or more embodiments, a leaf layer (110) is a set of any number of network devices (e.g., leaf devices (112, 114, 116)) that provide network connectivity to any number of attached devices, such as computing devices (not shown). In one or more embodiments, a computing device is any device or any set of devices capable of electronically processing instructions and that includes, at least, one or more processors, memory, input and output device(s), and network connectivity via a leaf layer (110). Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer, and/or any other mobile computing device), and/or any other type of computing device with the aforementioned requirements. Other examples of devices for which a leaf layer (110) may provide network connectivity include, but are not limited to, data storage devices (not shown), other network devices (e.g., wireless routers) (not shown), media devices (e.g., televisions) (not shown), etc.

In one or more embodiments, a spine layer (102) is a set of any number of network devices (e.g., spine devices (104, 106, 108)) that provide network connectivity between network devices of a leaf layer (110), and may also be operatively connected to other network devices, such as edge routers (not shown), gateway routers (not shown), network controllers (not shown), etc. In one or more embodiments, each leaf device (112, 114, 116) within a leaf layer (102) is operatively connected to each spine device (104, 106, 108) within a spine layer (102), and each spine device (104, 106, 108) within a spine layer is operatively connected to each leaf device (112, 114, 116) within a leaf layer (102). Such connections may be referred to as creating a dense mesh (e.g., a full mesh) between the leaf layer (110) and the spine layer (102), thereby creating a dense network topology (100).

In one or more embodiments, each leaf device (112, 114, 116) and each spine device (104, 106, 108) is a network device. In one or more embodiments, a network device may be a physical device that includes and/or may operatively connected to persistent storage (not shown), memory (e.g., random access memory (RAM)) (not shown), one or more processor(s) (e.g., integrated circuits) (not shown), and two or more physical network interfaces (which may also be referred to as ports).

As shown in FIG. 1, examples of such interfaces include ports S:1, S:2, and S:3 on each spine device (104, 106, 108) and ports L:1, L:2, and L:3 on each leaf device (112, 114, 116). Although not shown in FIG. 1, leaf devices (112, 114, 116) and/or spine devices (104, 106, 108) may have any number of additional ports. In one or more embodiments, the one or more processors of a network device (e.g., a central processing unit) are separate components from a network chip, one or more of which may also be components of a network device.

In one or more embodiments, the network device also includes any number of network chips. In one or more embodiments, a network chip is any hardware (e.g., circuitry), software, firmware, and/or combination thereof that includes functionality to receive, process, and/or transmit network traffic data units in accordance with one embodiment. In order to perform such functionality, a network chip may include any number of components. Such components may include, but are not limited to, one or more processors, one or more buffers (e.g., for implementing receive and/or transmit queues, such as virtual output queues (VOQs)), any type or amount of non-volatile storage, and/or any type or amount of volatile storage (e.g., RAM). A network chip may also include and/or be operatively connected to any number of physical network interfaces (e.g., L:1, L:2, L:3, S:1, S:2, or S:3 as shown in FIG. 1) of a network device. Such interfaces may provide a path external to the network device (e.g., to other devices), and/or may be operatively connected to other components internal to the network device (100), and each such interface may be an ingress and/or egress interface.

In one or more embodiments, a network device includes functionality to receive network traffic data units (e.g., frames, packets, etc.) at any of the physical network interfaces (i.e., ports) of the network device and to process the network traffic data units to determine whether to: (i) drop the network traffic data unit; (ii) process the network traffic data unit; and/or (iii) transmit the network traffic data unit, based on the processing, from a physical network interface or port on the network device in accordance with one embodiment.

As a non-limiting example, a network chip may be hardware that receives network traffic data units at an ingress port, and determines out of which egress port on the network device (100) to forward the network traffic data units such as, for example, media access control (MAC) frames that may include Internet Protocol (IP) packets.

In one or more embodiments, a network device (e.g., leaf devices (112, 114, 116), spine devices (104, 106, 108)) may include functionality to store (e.g., in persistent storage, in memory, etc.), any number of data structures for facilitating operation of at least some aspects of the network device. An example of such a data structure is a link state database (not shown).

In one or more embodiments, a link state database is a data structure for storing link state information received from neighboring network devices via the ports of a network device. In one or more embodiments, network devices within a network topology (100) (or a portion thereof (e.g., a logical area within the topology)) share link state information using any of a variety of types data units (e.g., packets, frames, messages, advertisements, etc.). Such data units may be sent from one network device to directly connected adjacent network devices, and may include information related to the state of links between the sending network device and other devices to which the sending network device is operatively connected.

When a data unit that includes link state information is received at a network device from an adjacent network device, the receiving network device may, in turn, propagate the data unit to its own adjacent network devices. Such sharing of link state information between network devices may occur within a network topology implementing an interior gateway protocol (IGP). Examples of an IGP include, but are not limited to, intermediate system to intermediate system (IS-IS) and open shortest path first (OSPF), each of which may be referred to as a type of IGP known as a link-state routing protocol.

In one or more embodiments, when a link-state routing protocol is implemented within a given network topology (or a portion therein), each device participating in the link-state routing topology receives, directly or indirectly, link state information from other devices in the network topology, or logical area within the network topology. In one or more embodiments, each network device uses the received information to build a mapping of the connectivity of network devices within the topology or logical area. Information relating to the mapping may be stored in the link state database.

A network device with a complete mapping of the connectivity of network devices within a topology or logical area may then use any scheme (e.g., the Dijkstra algorithm) to determine a best path (e.g., shortest path, path with the least cost, etc.) from itself to other network devices in the network topology or logical area, and such information may be stored in the link state database and/or used to program other portions of the network device (e.g., a routing information base) with information to be used, for example, when processing a received network traffic data unit. The map of connectivity are generally the same on each network device in a topology or logical area, unless one or more network devices have a change in information related to the state of one or more links. Accordingly, once a mapping has been determined, link state information may be sent from a given network device when a change to link state information of any link of a network device occurs.

Link-state routing protocols often implement the sending of link state information to adjacent devices in a process often referred to as flooding, which is when the information is sent to each adjacent connected network device, all of which then send to each of their adjacent network devices, and so on, until all network devices have received the link state information. However, in a dense network topology (100), such flooding may lead to a large quantity of redundant data units being transmitted to network devices.

For example, in the spine-leaf network topology (100) shown in FIG. 1, if a link state change is detected on leaf device A (112), information related to the change may be flooded to each of the three spine devices (104, 106, 108). Each of the spine devices may then send the change to leaf device B (114) and leaf device N (116), each of which may send the change back to spine devices, etc. Such redundancy of receipt of link state information when changes occur within a dense network topology may lead to reduced performance of any given network device and/or the network topology as a whole, because each redundant data item must be processed in order to determine that it may ultimately be discarded. As an example, the packet queues (not shown) of a network device leading to a control plane (not shown) of the network device are necessarily of finite size. Therefore, if the flooding rate exceeds the update processing rate for enough time, the control plan may be obligated to drop incoming updates. If such lost updates are of significance, stabilization of the link state database and the convergence of the network may be delayed.

One embodiment may lessen the possibility of reduced performance by only flooding link state change information within a computed flooding topology, which uses only a subset of the links connecting network devices within a network topology (100). Flooding topologies are discussed further in the description of FIG. 2, below.

In one or more embodiments, the network device also includes software and/or firmware stored in any network device storage (not shown) and/or network device memory (not shown) (i.e., non-transitory computer readable mediums). Such software may include instructions which, when executed by the one or more processors (not shown) of the network device, cause the one or more processors to perform operations in accordance with one embodiment. The software instructions may be in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments. The functionality of a network device is not limited to the aforementioned examples.

Examples of a network device include, but are not limited to, a network switch, a router, a multilayer switch, a fibre channel device, an InfiniBand® device, etc. A network device is not limited to the aforementioned specific examples.

While FIG. 1 shows a configuration of components, other configurations may be used without departing from the scope. For example, the network topology may be any dense network topology other than the spine-leaf topology shown in FIG. 1. As another example, the quantity of network devices in the spine layer may be less (or more) than the quantity of network devices in the leaf layer. As another example, each leaf device and each spine device may have any number of additional ports for connecting to any number of other devices, or that may not be connected to any other device at a given time. Accordingly, embodiments disclosed herein should not be limited to the configuration of components shown in FIG. 1.

Figure 2:
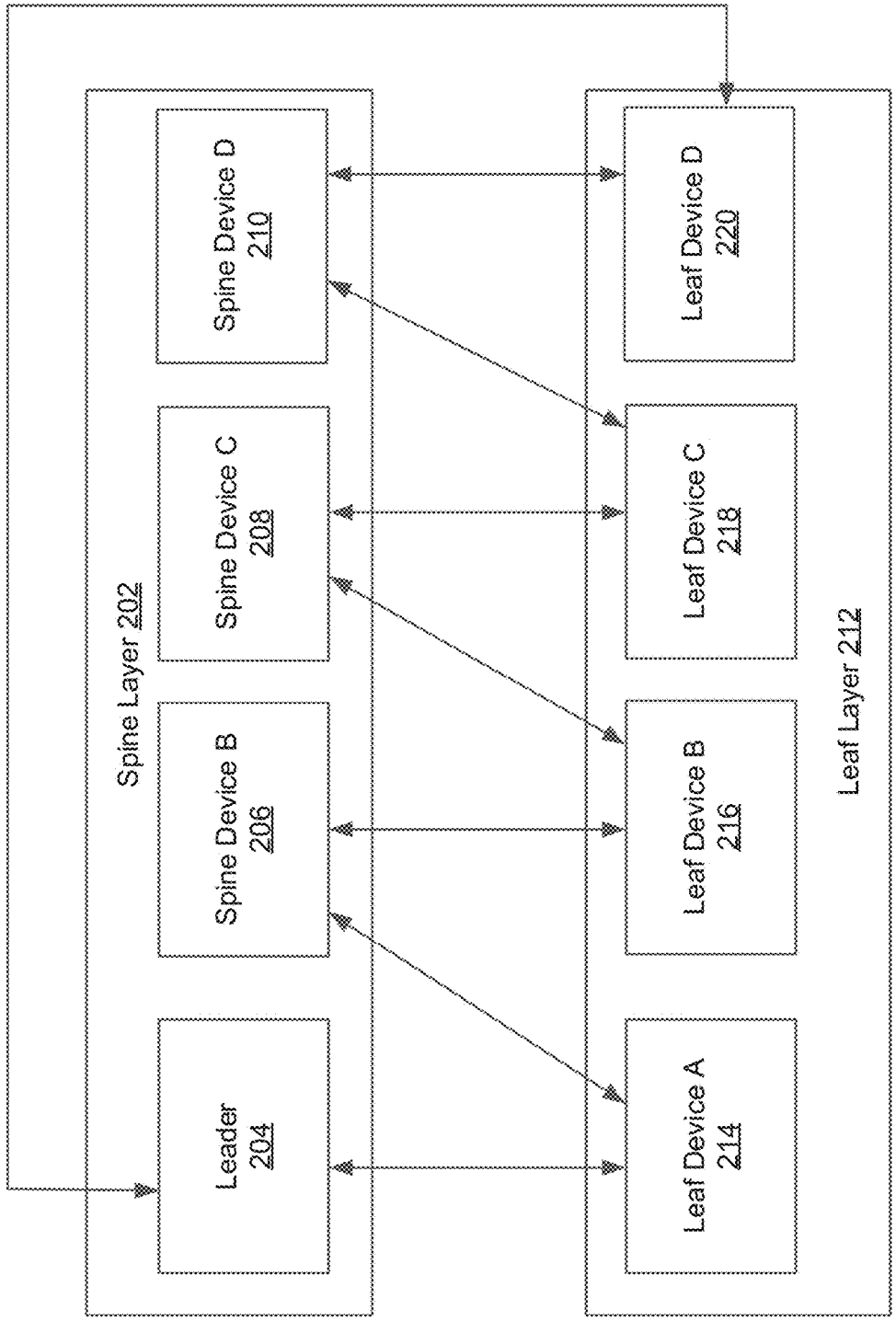
FIG. 2 shows a flooding topology in accordance with one or more embodiments described herein.

FIG. 2 shows a flooding topology in accordance with one or more embodiments. As shown in FIG. 2, the flooding topology (200) includes a leaf layer (212) and a spine layer (202). The spine layer (202) may include a leader (204), spine device B (206), spine device C (208), and spine device D (210). The leaf layer may include leaf device A (214), leaf device B (216), leaf device C (218), and leaf device D (220). Each of these components is described below.

In one or more embodiments, the leaf layer (212) is substantially similar to the leaf layer (110) shown in FIG. 1 and discussed above. Additionally, in one or more embodiments, the spine layer (202) is substantially similar to the spine layer (102) shown in FIG. 1 and discussed above.

In one or more embodiments, each of the leaf devices (214, 216, 218, 220) and each of the spine devices (204, 206, 208, 210) are network devices and, as such, are substantially similar, respectively, to the leaf devices (112, 114, 116) and the spine devices (104, 106, 108) shown in FIG. 1 and discussed above. However, for the sake of clarity, all of the connections between each leaf device (214, 216, 218, 220) and each spine device (204, 206, 208, 210) are not shown in FIG. 2. Instead, only a subset of the connections is shown. The subset may be referred to as a flooding topology (200).

In one or more embodiments, a flooding topology (200) is a subset of links within a dense network topology that includes enough links such that there is at least one path between each network device in the topology to each other network device in the topology. In one or more embodiments, link state updates are only flooded on links included in the flooding topology (200), rather than to all links connected to adjacent network devices, which may reduce the redundancy of flooding within a network topology implementing a link-state routing protocol. In one or more embodiments, a flooding topology (200) may include more than one path between each device and every other device. For example, as shown in FIG. 2, there are two paths between each network device and every other network device, which may be referred to as a bi-connected flooding topology.

However, while the simple bi-connected cycle shown in FIG. 2 may be adequate as a flooding topology (200) for correctness and resiliency, such a flooding topology may not be optimal for convergence of link state databases on each of the network devices within the topology, because the diameter (i.e., the longest path between any two network devices in a topology) of the flooding topology may be half the number of network devices in the topology, which may cause an undesired delay in link state update propagation. Therefore, in one or more embodiments, the actual flooding topology may have a bound on the diameter, which may be referred to as a diameter threshold.

Additionally, although FIG. 2 shows a flooding topology (200) where each network device has two links used as part of the flooding topology, as more redundant paths between nodes are added to a flooding topology (200), and when attempting to keep the diameter of the flooding topology below a diameter threshold, specific network devices may end up with more links as part of the flooding topology than other devices. Having a high number of links as part of the flooding topology may cause reduced performance for the network devices with a high number of links. Accordingly, when computing a flooding topology, in one or more embodiments, the number of links within the flooding topology (i.e., the degree) of any given network device may be bounded, which may be referred to as a threshold node degree.

In one or more embodiments, at least one network device in the flooding topology is elected as a leader (204). In one or more embodiments, a leader (204) is a network device elected using any scheme for electing a leader within a network topology of logical area of a network topology. In one or more embodiments, the leader includes functionality to compute a flooding topology, encode the computed flooding topology, and distribute the encoded flooding topology within a network topology or logical area therein.

While FIG. 2 shows a configuration of components, other configurations may be used without departing from the scope. For example, as discussed above, there may be more links in the subset of links that are the flooding topology, leading to more paths between network devices (i.e., greater path redundancy). As another example, the leader may be any device in the topology, rather than a spine device as shown in FIG. 2. As another example, there may be differing numbers of devices in the spine layer and the leaf layer. As another example, there may be differing numbers of links on the various network devices that are part of the flooding topology. Accordingly, embodiments disclosed herein should not be limited to the configuration of components shown in FIG. 2.

Figure 3:
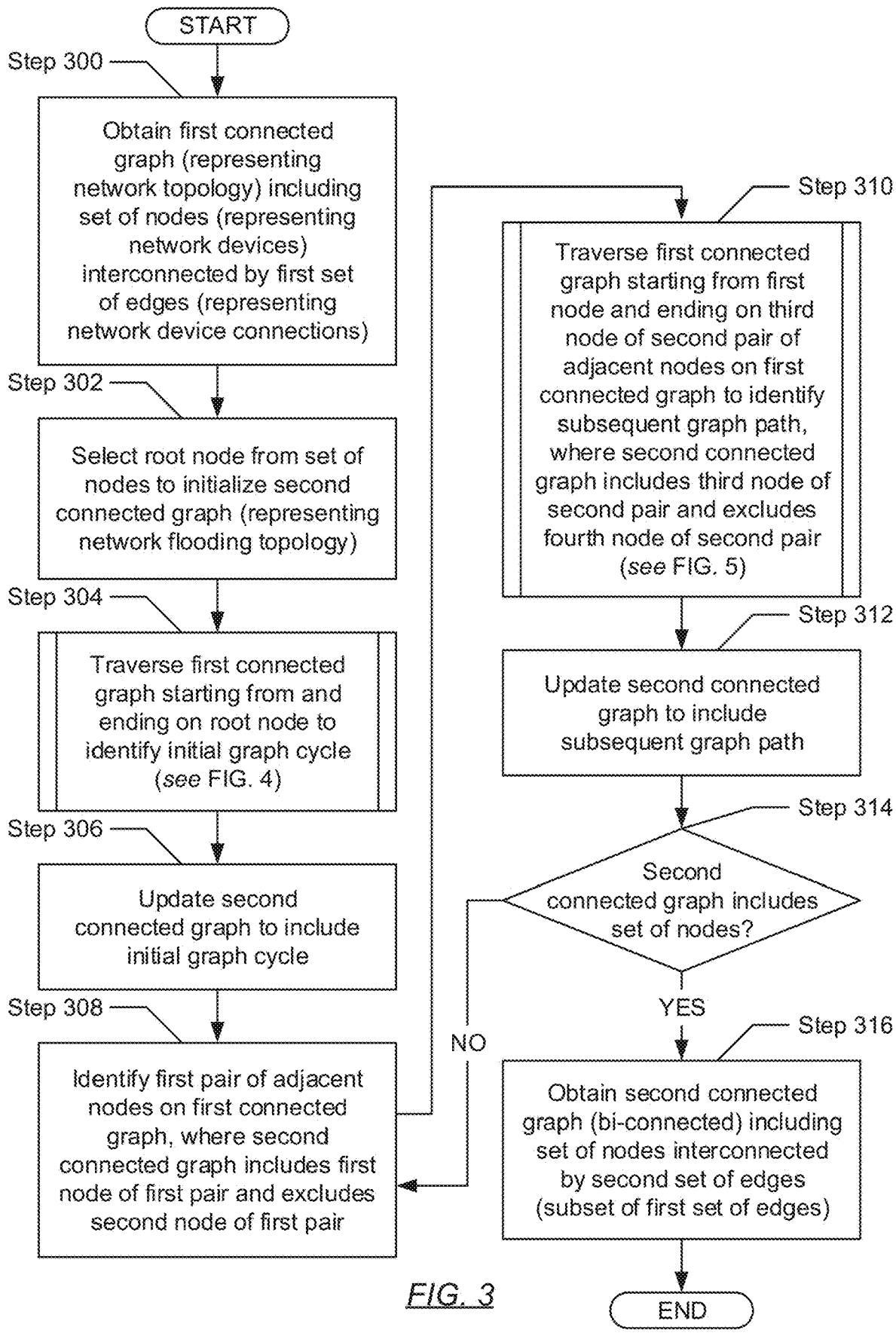
FIG. 3 shows a flowchart describing a method for network flooding topology computation in accordance with one or more embodiments described herein.

FIG. 3 shows a flowchart describing a method for network flooding topology computation in accordance with one or more embodiments. The various steps outlined below may be performed by the leader of a network topology (see e.g., FIG. 2). Further, while the various steps in the flowchart are presented and described sequentially, one of ordinary skill will appreciate that some or all steps may be executed in different orders, may be combined or omitted, and some or all steps may be executed in parallel.

Figure 6A:
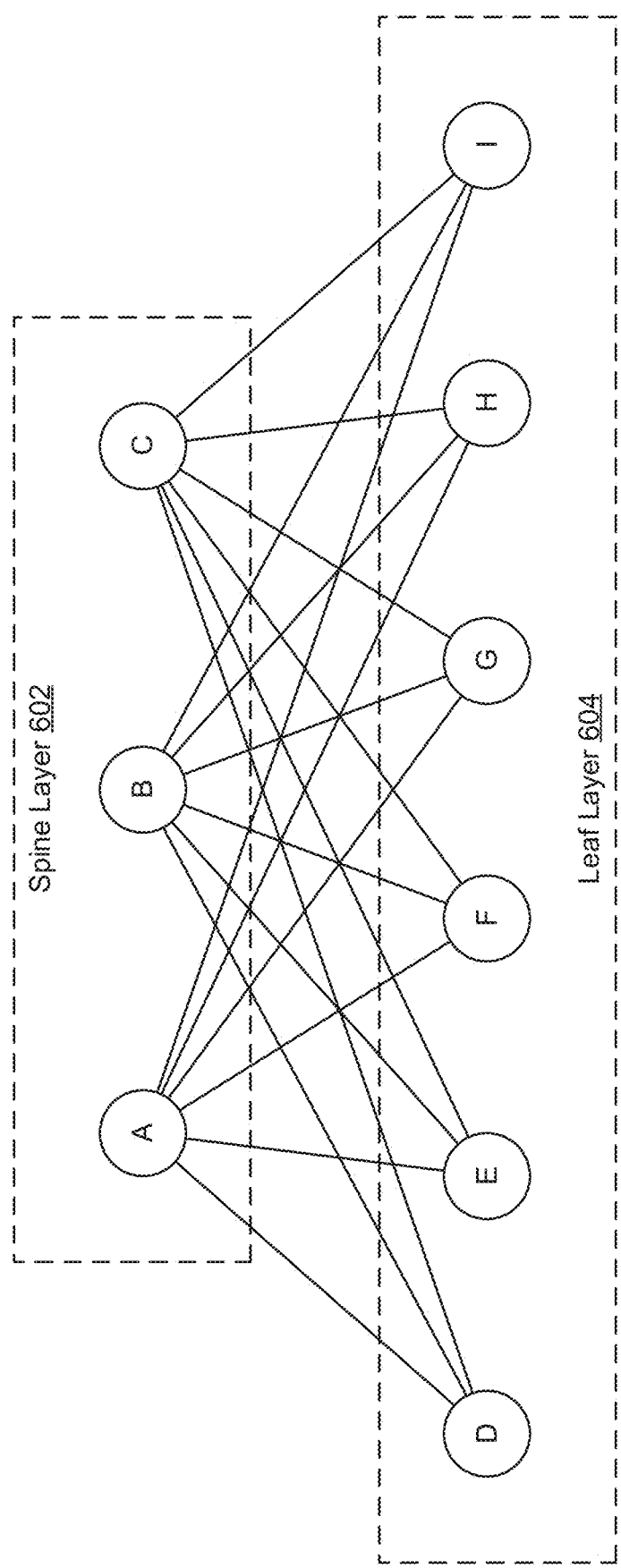

Turning to FIG. 3, in Step 300, a first connected graph is obtained. In one or more embodiments, the first connected graph may represent a network topology (see e.g., FIG. 1) of a network. Further, the first connected graph may include a set of nodes, representing the set of network devices in the network, interconnected by a first set of edges representing the interconnections between the set of network devices. An example of the first connected graph is illustrated in FIG. 6A, where the set of nodes may be shown as the labeled circles and the first set of edges may be shown as the solid lines connecting the various labeled circles.

In Step 302, a root node is selected from the above-mentioned set of nodes of the first connected graph (obtained in Step 300). In one or more embodiments, the root node may be used to initialize a second connected graph representing a flooding topology (see e.g., FIG. 2) of the network. Further, selection of the root node may entail identifying a node of the set of nodes that reflects a highest node degree. The degree (or node degree) of any given node of a connected graph may refer to the number of links or edges which touch the given node. For example, referring to the exemplary first connected graph shown in FIG. 6A, the node degree for node A is six (i.e., six edges touch node A), whereas the node degree for node D is three (i.e., three edges touch node D). Accordingly, based on this logic, the root node may refer to a node of the first connected graph that touches the highest number of edges. Should two or more nodes of the first connected graph reflect equal highest node degrees, then the root node may be selected from these two or more nodes based on additional factors—e.g., a central processing unit (CPU) capacity of the node, a memory capacity of the node, a number of unused network interfaces (or ports) on the node, and/or a centrality of the node in the network topology.

In Step 304, the first connected graph (obtained in Step 300) is traversed to identify an initial graph cycle. In one or more embodiments, the initial graph cycle may represent a path formed from a subset of the set of nodes, which may be connected through a subset of the first set of edges. The subset of the set of nodes may encompass the root node from and to which the initial graph cycle originates and terminates, and one or more other nodes of the first connected graph. Further, the aforementioned other node(s) may be non-repetitive, or may only be visited once each. Similarly, the subset of the first set of edges may also be non-repetitive. Traversal of the first connected graph to identify the initial graph cycle is described in further detail below with respect to FIG. 4.

In Step 306, the second connected graph (initialized in Step 302) is updated to include (or absorb) the initial graph cycle (identified in Step 304). Hereafter, in Step 308, a first pair of adjacent nodes, of the set of nodes forming the first connected graph, is identified. Specifically, in one or more embodiments, the first pair of adjacent nodes may refer to two nodes connected to one another through an edge of the first set of edges. Further, the first pair of adjacent nodes may include a first node that has previously been absorbed and, hence, may form the second connected graph at least in part; and a second node that has yet to be incorporated into the second connected graph. Identification of the first pair of adjacent nodes may be constrained or bound by a user-configurable maximum or threshold node degree. In general, a degree of a given node in a connected graph may reflect the number of edges touching the given node (or links connecting the given node to another node). Accordingly, the threshold node degree may refer to a maximum number of edges that may touch any node of the connected graph.

In Step 310, the first connected graph (obtained in Step 300) is traversed to identify a subsequent graph path. In one or more embodiments, the subsequent graph path may represent another path formed from a subset of the set of nodes, which may be connected through a subset of the first set of edges. More specifically, the subsequent graph path may represent a path that originates at/from the above-mentioned first node (i.e., previously absorbed by the second connected graph) of the first pair of adjacent nodes (identified in Step 308) and terminates at/to one of the nodes (i.e., a third node) of a second pair of adjacent nodes. Like the first pair of adjacent nodes, the second pair of adjacent nodes may refer to two nodes connected to one another through an edge of the first set of edges. The second pair of adjacent nodes may include the (path-terminating) third node that has previously been absorbed to form part of the second connected graph; and a fourth node that has yet to be incorporated into the second connected graph. Identification of the second pair of adjacent nodes may be constrained or bound by a user-configurable maximum or threshold node degree. In general, a degree of a given node in a connected graph may reflect the number of edges touching the given node (or links connecting the given node to another node). Accordingly, the threshold node degree may refer to a maximum number of edges that may touch any node of the connected graph. In one or more embodiments, the aforementioned second and fourth nodes may be the same node.

Subsequently, in one or more embodiments (i.e., when the second and fourth nodes are not the same node), the subset of the set of nodes, forming the subsequent graph path, may encompass the first and second nodes of the first pair of adjacent nodes, the third and fourth nodes of the second pair of adjacent nodes, and zero or more other nodes of the first connected graph, where the other nodes (if any) may be visited non-repetitively between the aforementioned second and fourth nodes. In another embodiment (i.e., when the second and fourth nodes are the same node), the subset of the set of nodes, forming the subsequent graph path, may encompass the first and second nodes of the first pair of adjacent nodes, and the third node of the second pair of adjacent nodes. In yet another embodiment (i.e., in degenerate cases), the subset of the set of nodes, forming the subsequent graph path, may encompass the first node of the first pair of adjacent nodes and the third node of the second pair of adjacent nodes. Further, in any of the aforementioned embodiments, any node of the first and second pairs of adjacent nodes may also be non-repetitive and, thus, may only be visited once in the formation of the subsequent graph path.

Moreover, in one or more embodiments (i.e., when the second and fourth nodes are not the same node), the subset of the first set of edges, forming the subsequent graph path, may include a first edge connecting the first pair of adjacent nodes, a second edge connecting the second pair of adjacent nodes, and at least one other edge of the first set of edges connecting the zero or more other nodes visited between the second node and the fourth node of the first and second pairs of adjacent nodes, respectively. In another embodiment (i.e., when the second and fourth nodes are the same node), the subset of the first set of edges, forming the subsequent graph path, may include a first edge connecting the first pair of adjacent nodes and a second edge connecting the second node and the third node of the first and second pairs of adjacent nodes, respectively. In yet another embodiment (i.e., in degenerate cases), the subset of the first set of edges, forming the subsequent graph path, may include a single edge connecting the first node and the third node of the first and second pairs of adjacent nodes, respectively.

Traversal of the first connected graph to identify the subsequent graph path is described in further detail below with respect to FIG. 5.

In Step 312, the second connected graph (updated in Step 306) is further updated to include (or absorb) the subsequent graph cycle (identified in Step 310). Hereafter, in Step 314, a determination is made as to whether the second connected graph (updated in Step 312) includes (or has absorbed) each node of the set of nodes representing the first connected graph. In one or more embodiments, if it is determined that the aforementioned set of nodes, in entirety, has been incorporated into the second connected graph, then the process proceeds to Step 316. On the other hand, in another embodiment, if it is alternatively determined that at least one node of the set of nodes remains to be absorbed by the second connected graph, then the process alternatively proceeds to Step 308 (where another first pair of adjacent nodes may be identified to form and identify another subsequent graph path thereafter).

In Step 316, upon determining (in Step 312) that the second connected graph (updated in Step 312) includes (or has absorbed) each node of the set of nodes representing the first connected graph, computation of the network flooding topology terminates. Upon termination, in one or more embodiments, the second connected graph may reflect a bi-connected graph, or a graph where each node of the graph touches at least two edges. In another embodiment (i.e., in degenerate cases), the second connected graph may not reflect a bi-connected graph. Further, upon termination, the second connected graph may include a second set of edges interconnecting the set of nodes, where the second set of edges includes a subset of the first set of edges interconnecting the set of nodes in the first connected graph.

Figure 4:
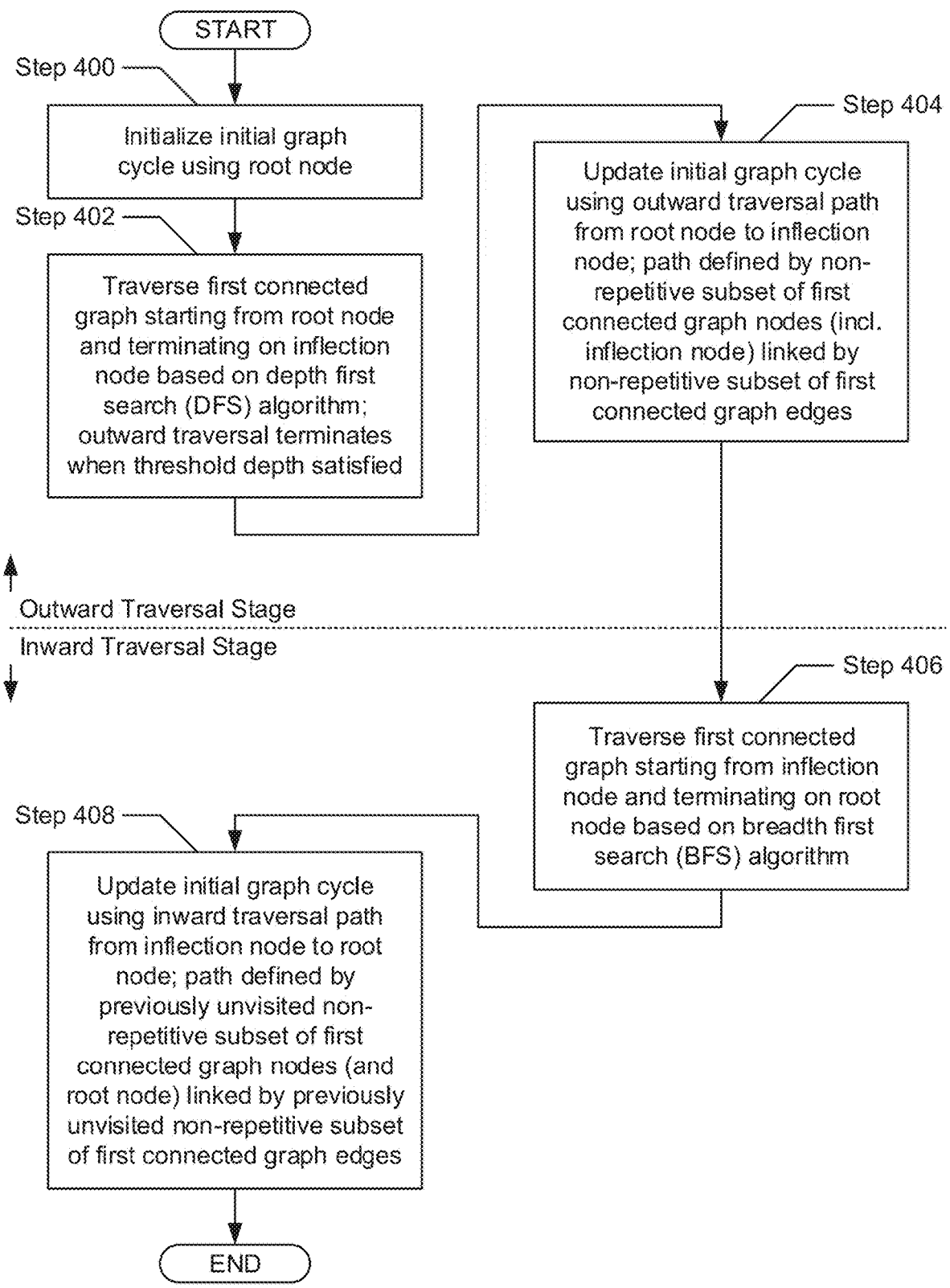
FIG. 4 shows a flowchart describing a method for identifying an initial graph cycle in accordance with one or more embodiments described herein.

FIG. 4 shows a flowchart describing a method for identifying an initial graph cycle in accordance with one or more embodiments. The various steps outlined below may be performed by the leader of a network topology (see e.g., FIG. 2). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, the initial graph cycle (described above) (see e.g., FIG. 3) is initialized using a root node. In one or more embodiments, the root node may be selected from a set of nodes included in a first connected graph. The first connected graph may represent a network topology (see e.g., FIG. 1) of a network, whereas the set of nodes may represent a set of network devices in the network. Selection of the root node is detailed above (see e.g., Step 302 of FIG. 3).

In Step 402, the first connected graph is subsequently traversed to identify an outward traversal path. In one or more embodiments, the outward traversal path may represent a path that originates at the root node (used to initialize the initial graph cycle in Step 400), terminates at an inflection node (described below), and may visit zero or more intermediate nodes in between the root and inflection nodes. Further, the traversal process may follow any existing depth first search (DFS) algorithm until a user-configurable maximum or threshold depth is met. In general, a depth of a given node in a connected graph may reflect the number of edges forming a path from the root (i.e., the root node) to the given node. Accordingly, the threshold depth may refer to a maximum number of edges forming a path from the root node to another node (of the set of nodes), where the aforementioned inflection node represents that other node. By way of an example, the threshold depth may be set to the computed network diameter of the first connected graph.

Furthermore, in one or more embodiments, the above-mentioned inflection node and intermediate node(s) (if any), of the outward traversal path, may encompass a previously unvisited and/or non-repetitive subset of the set of nodes included in the first connected graph. Similarly, the one or more edges connecting the nodes, forming the outward traversal path, may include a previously unvisited and/or non-repetitive subset of a set of edges (i.e., the first set of edges mentioned in the description of FIG. 3) interconnecting the set of nodes of the first connected graph.

In Step 404, the initial graph cycle (initialized in Step 400) is updated to include (or absorb) the outward traversal path (identified in Step 402). Collectively, the steps (i.e., Steps 400 through 404) thus far described may outline an outward traversal stage (defined by the outward traversal of the first connected graph away from the root node) for identifying the initial graph cycle. In contrast, the remaining steps (i.e., Steps 406 and 408) yet to be described may alternatively outline an inward traversal stage (defined by the inward traversal of the first connected graph returning to the root node) for identifying the initial graph cycle.

In Step 406, the first connected graph is traversed to identify an inward traversal path. In one or more embodiments, the inward traversal path may represent a path that originates at the inflection node (at which the outward traversal path had terminated), terminates at the root node (from which the outward traversal path had originated), and may visit zero or more other intermediate nodes (i.e., different from the intermediate nodes which may have been visited along the outward traversal path) in between the inflection and root nodes. Further, the traversal process may follow any existing breadth first search (BFS) algorithm By traversing outwardly using a DFS algorithm (constrained with a depth threshold) and inwardly using a BFS algorithm, a diameter of the second connected graph may be limited.

Moreover, in one or more embodiments, the above-mentioned other intermediate node(s) (if any), of the inward traversal path, may encompass a previously unvisited and/or non-repetitive subset of the set of nodes included in the first connected graph. Similarly, the one or more edges connecting the nodes, forming the inward traversal path, may include a previously unvisited and/or non-repetitive subset of the set of edges (i.e., the first set of edges mentioned in the description of FIG. 3) interconnecting the set of nodes of the first connected graph. Thereafter, in Step 408, the initial graph cycle (updated in Step 404) is further updated to include (or absorb) the inward traversal path (identified in Step 406).

Figure 5:
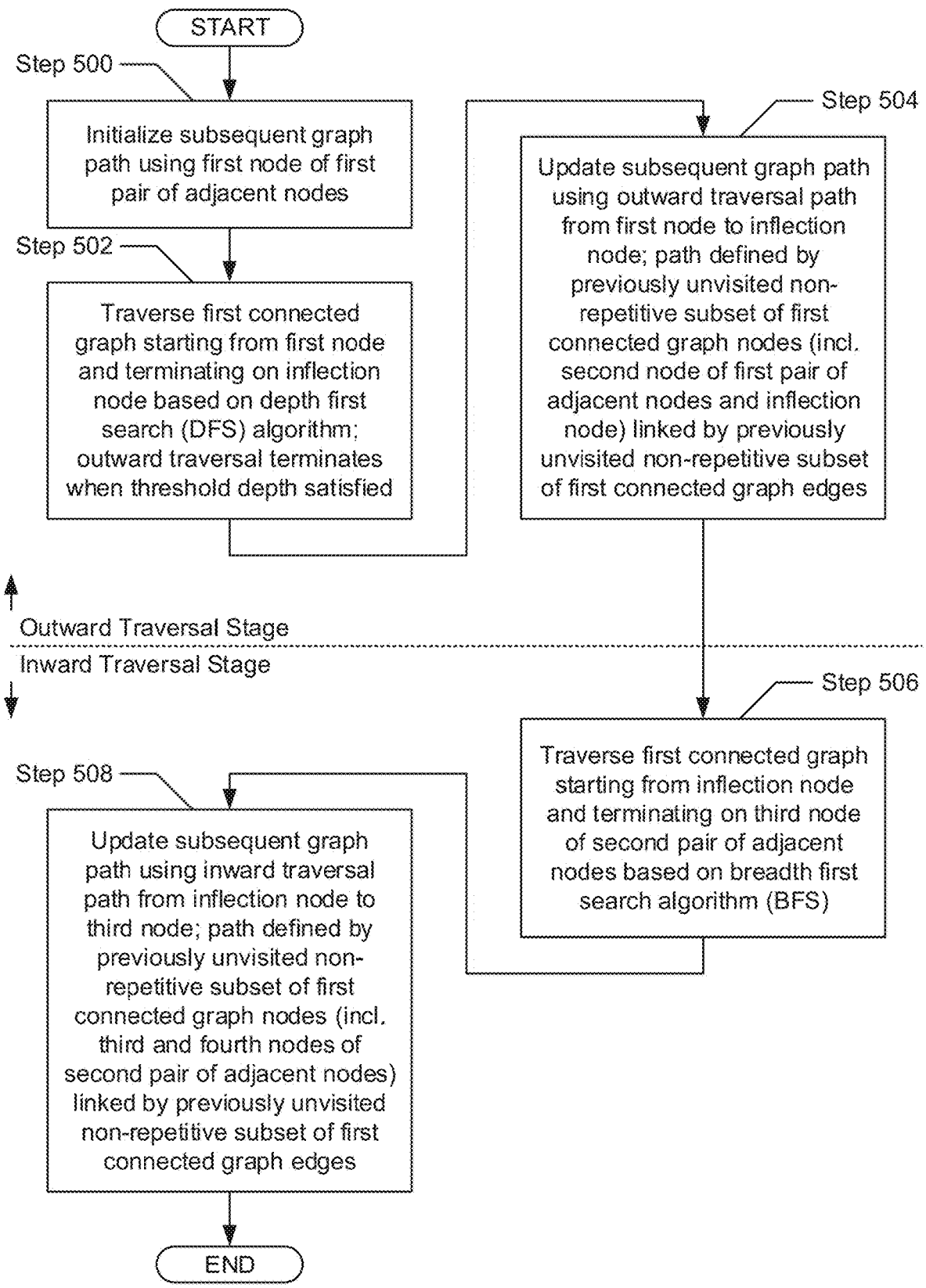
FIG. 5 shows a flowchart describing a method for identifying a subsequent graph path in accordance with one or more embodiments described herein.

FIG. 5 shows a flowchart describing a method for identifying a subsequent graph path in accordance with one or more embodiments. The various steps outlined below may be performed by the leader of a network topology (see e.g., FIG. 2). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, the subsequent graph path (described above) (see e.g., FIG. 3) is initialized using a first node of a first pair of adjacent nodes. In one or more embodiments, the first pair of adjacent nodes may refer to two nodes connected to one another through an edge of a set of edges (i.e., the first set of edges mentioned in the description of FIG. 3) interconnecting a set of nodes of a first connected graph. The first connected graph may represent a network topology (see e.g., FIG. 1) of a network, whereas the set of nodes may represent a set of network devices in the network. Further, the first pair of adjacent nodes may include the first node, which may refer to a node (of the set of nodes) that has previously been absorbed and, hence, may at least in part form a second connected graph representing a flooding topology (see e.g., FIG. 2) of the network; and a second node that has yet to be incorporated into the second connected graph.

In Step 502, the first connected graph is subsequently traversed to identify an outward traversal path. In one or more embodiments, the outward traversal path may represent a path that originates at the first node of the first pair of adjacent nodes (used to initialize the subsequent graph path in Step 500), terminates at an inflection node (described below), and may visit zero or more intermediate nodes in between the first and inflection nodes. Further, the traversal process may follow any existing depth first search (DFS) algorithm until a user-configurable maximum or threshold depth is met. In general, a depth of a given node in a connected graph may reflect the number of edges forming a path from the root (i.e., the first node of the first pair of adjacent nodes) to the given node. Accordingly, the threshold depth may refer to a maximum number of edges forming a path from the first node to another node (of the set of nodes), where the aforementioned inflection node represents that other node.

Furthermore, in one or more embodiments, the above-mentioned inflection node and intermediate node(s) (if any), of the outward traversal path, may encompass a previously unvisited and/or non-repetitive subset of the set of nodes included in the first connected graph. Similarly, the one or more edges connecting the nodes, forming the outward traversal path, may include a previously unvisited and/or non-repetitive subset of the set of edges (i.e., the first set of edges mentioned in the description of FIG. 3) interconnecting the set of nodes of the first connected graph.

In Step 504, the subsequent graph path (initialized in Step 500) is updated to include (or absorb) the outward traversal path (identified in Step 502). Collectively, the steps (i.e., Steps 500 through 504) thus far described may outline an outward traversal stage (defined by the outward traversal of the first connected graph away from the first node of the first pair of adjacent nodes) for identifying the subsequent graph path. In contrast, the remaining steps (i.e., Steps 506 and 508) yet to be described may alternatively outline an inward traversal stage (defined by the inward traversal of the first connected graph towards a third node of a second pair of adjacent nodes) for identifying the subsequent graph path.

In one or more embodiments, the second pair of adjacent nodes may refer to two other nodes connected to one another through another edge of the set of edges (i.e., the first set of edges mentioned in the description of FIG. 3) interconnecting a set of nodes of a first connected graph. Further, the second pair of adjacent nodes may include the third node, which may refer to another node (i.e., aside from the first node of the first pair of adjacent nodes) (of the set of nodes) that has previously been absorbed and, hence, may also at least in part form the second connected graph; and a fourth node that has yet to be incorporated into the second connected graph. In one or more embodiments, the aforementioned second and fourth nodes may be the same node.

In Step 506, the first connected graph is traversed to identify an inward traversal path. In one or more embodiments, the inward traversal path may represent a path that originates at the inflection node (at which the outward traversal path had terminated), terminates at the third node of the second pair of adjacent nodes, and may visit zero or more other intermediate nodes (i.e., different from the intermediate nodes which may have been visited along the outward traversal path) in between the inflection and third nodes. Further, the traversal process may follow any existing breadth first search (BFS) algorithm By traversing outwardly using a DFS algorithm (constrained with a depth threshold) and inwardly using a BFS algorithm, a diameter of the second connected graph may be limited.

Moreover, in one or more embodiments, the above-mentioned other intermediate node(s) (if any), of the inward traversal path, may encompass a previously unvisited and/or non-repetitive subset of the set of nodes included in the first connected graph. Similarly, the one or more edges connecting the nodes, forming the inward traversal path, may include a previously unvisited and/or non-repetitive subset of the set of edges (i.e., the first set of edges mentioned in the description of FIG. 3) interconnecting the set of nodes of the first connected graph. Thereafter, in Step 508, the subsequent graph path (updated in Step 504) is further updated to include (or absorb) the inward traversal path (identified in Step 506).

FIGS. 6A-6H show an exemplary derivation of a flooding topology from a network topology in accordance with one or more embodiments. The following exemplary flooding topology derivation, presented in conjunction with components shown in FIGS. 6A-6H, is for explanatory purposes only and not intended to limit the scope.

Turning to FIG. 6A, a first connected graph (600), representing a network topology of an exemplary network, is illustrated. The first connected graph (600) includes a set of nodes (i.e., nine nodes), representing the set of network devices in the exemplary network, which are interconnected by a first set of edges representing the interconnections between the set of network devices. As portrayed in FIG. 6A, the set of nodes is shown as labeled (i.e., A-I) circles and the first set of edges is shown as the solid lines interconnecting the labeled circles. Further, the top three nodes (i.e., nodes A-C) of the first connected graph (600) may correspond to a spine layer (602) of the network topology, whereas the bottom six nodes (i.e., nodes D-I) of the first connected graph (600) may correspond to a leaf layer (604) of the network topology.

Figure 6B:
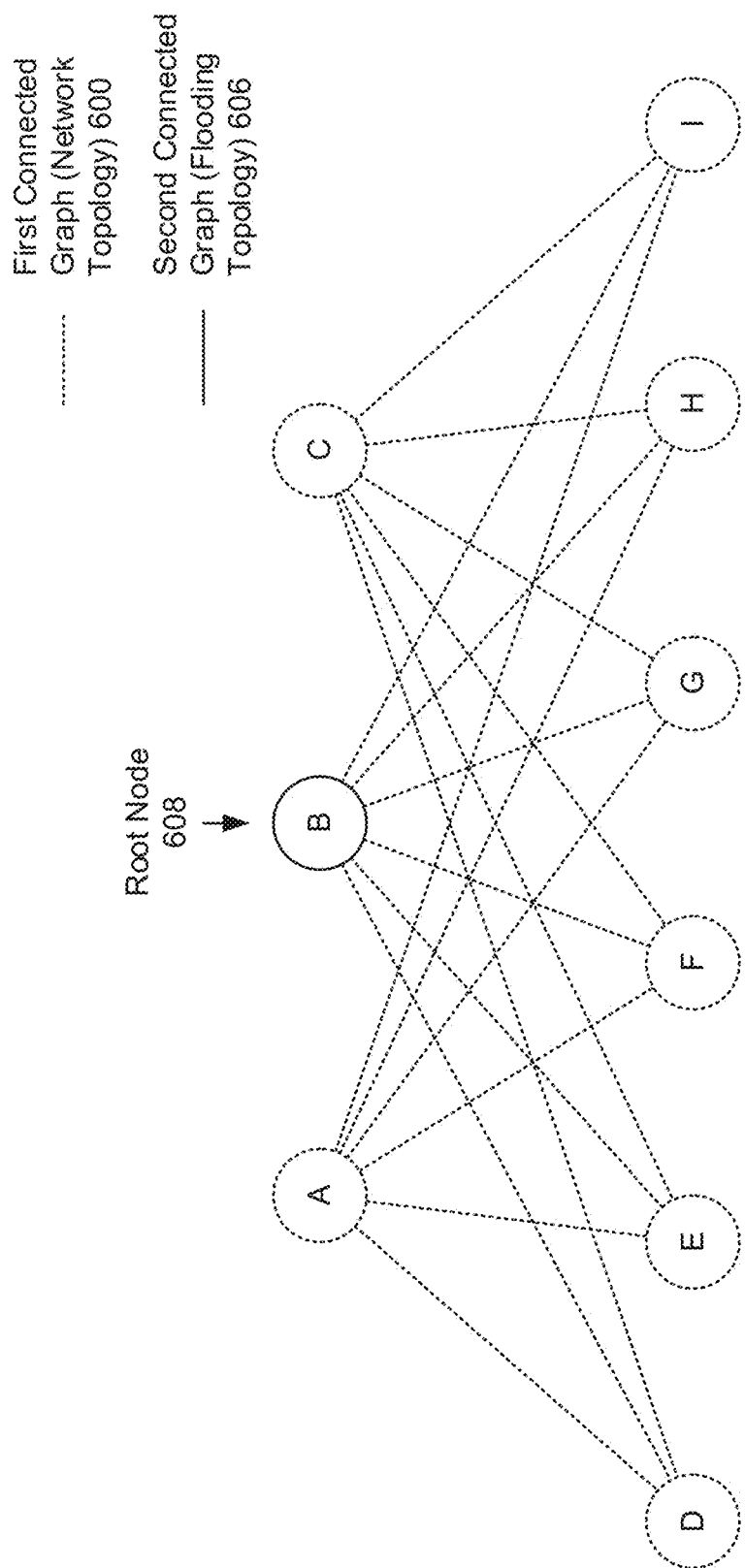

Turning to FIG. 6B, in order to initialize a second connected graph (606), representing a flooding topology corresponding to the network topology (600) of the exemplary network, a root node (608) is selected. Details concerning the selection of root nodes are described above with respect to FIG. 3. In this example, assume node B is selected to represent the root node (608). Further, hereinafter, nodes and edges belonging to the first connected graph (600) may be portrayed using dotted lines, whereas nodes and edges, of the first connected graph (600), that have been incorporated (or absorbed) into the second connected graph (606) may be alternatively portrayed using solid lines. Looking at FIG. 6B, for example, node B (i.e., the root node) is the only solid-line object shown therein, thereby disclosing that, at this initialization stage of the second connected graph (606), the root node (608) represents the sole object (i.e., node or edge) of the first connected graph (600) which has been absorbed into the second connected graph (606).

Turning to FIG. 6C, an initial graph cycle (610), from an unvisited subset of the nodes and edges (i.e., excluding the root node (608)) of the first connected graph (600), is identified. Details concerning the identification of initial graph cycles are described above with respect to FIG. 4. In this example, assume the nodal path B-D-C-G-B is identified to represent the initial graph cycle (610), where: node C represents the inflection node pertinent to the outward and inward traversal paths of the initial graph cycle (610). Following its identification, the initial graph cycle (610) is subsequently incorporated into the second connected graph (606).

Figure 6D:
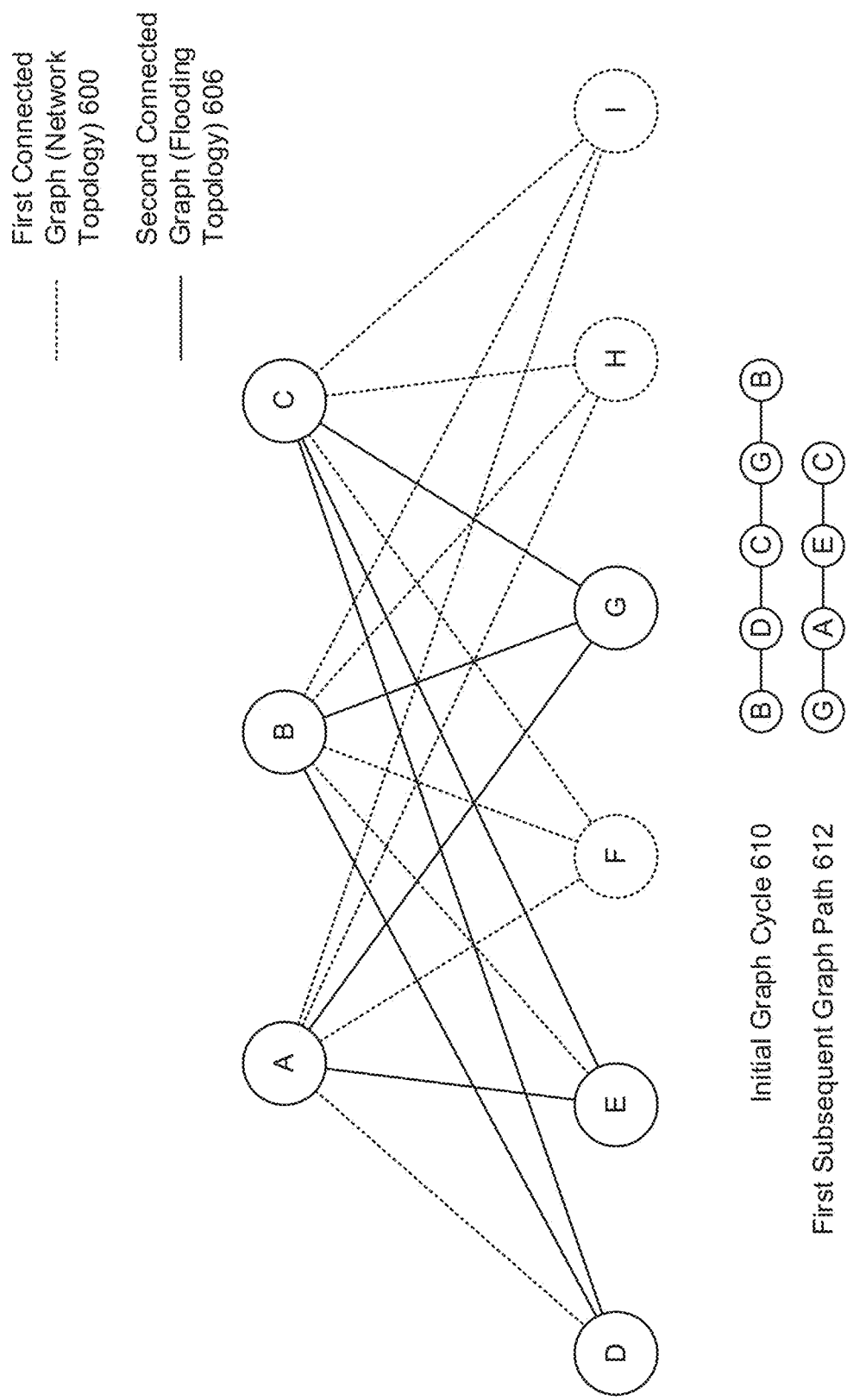

Turning to FIG. 6D, a first subsequent graph path (612), from an unvisited subset of nodes and edges (i.e., excluding the initial graph cycle (610)) of the first connected graph (600), is identified. Details concerning the identification of subsequent graph paths are described above with respect to FIG. 5. In this example, assume the nodal path G-A-E-C is identified to represent the first subsequent graph path (612), where: node G represents the first node (i.e., a node already incorporated into the second connected graph (606)) of the first pair of adjacent nodes; node A represents the second node (i.e., a node not yet incorporated into the second connected graph (606)) of the first pair of adjacent nodes; node C represents the third node (i.e., another node already incorporated into the second connected graph (606)) of the second pair of adjacent nodes; node E represents the fourth node (i.e., another node not yet incorporated into the second connected graph (606)) of the second pair of adjacent nodes; and node A or E may represent the inflection node pertinent to the outward and inward traversal paths of the first subsequent graph path (612). At least nodes G and C may be identified based on their respective node degrees, which may be bound by a threshold node degree set for the flooding topology. Following its identification, the first subsequent graph path (612) is subsequently incorporated into the second connected graph (606).

Figure 6E:
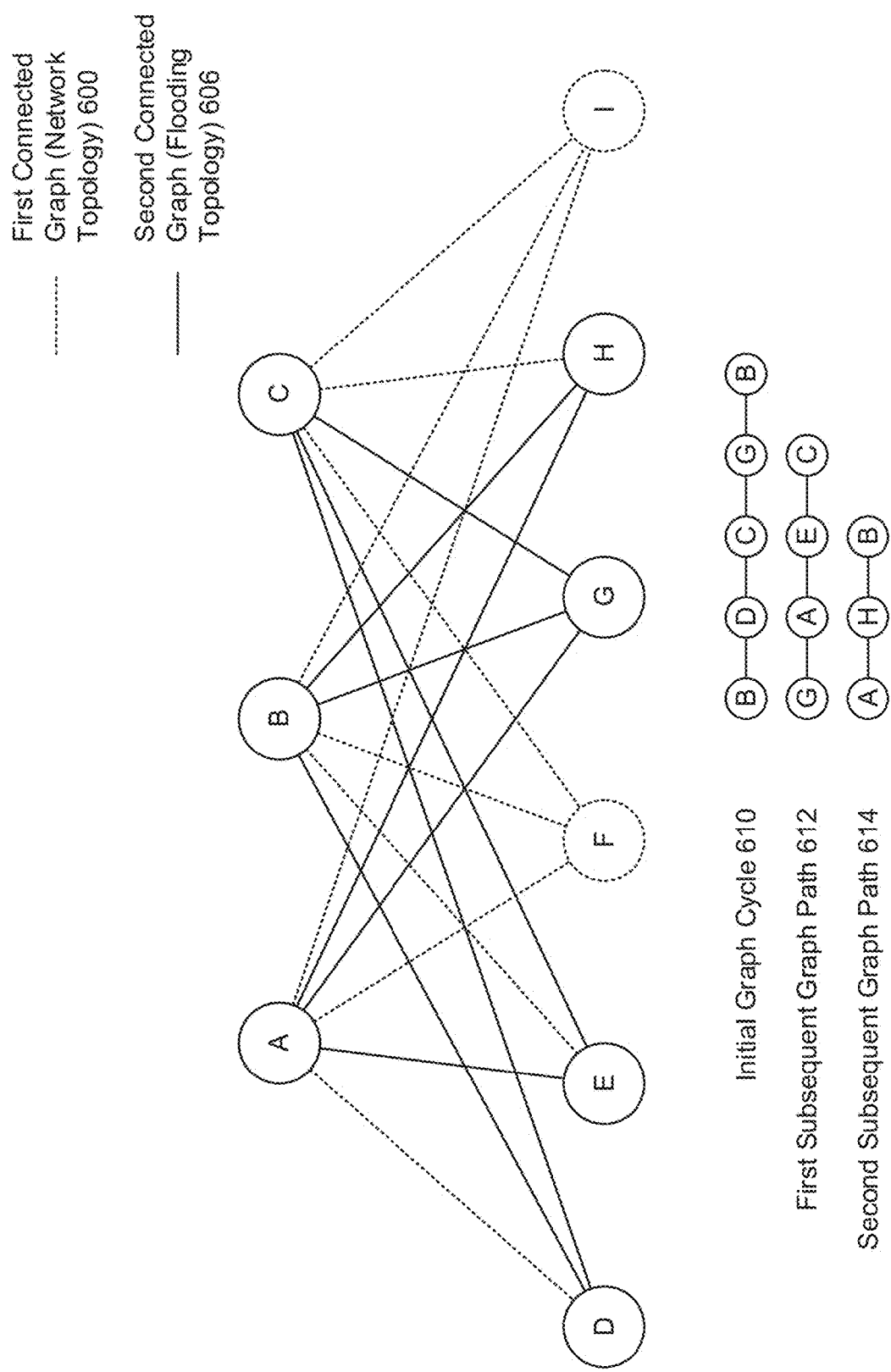

Turning to FIG. 6E, because the second connected graph (606) has yet to absorb all the nodes of the first connected graph (600), a second subsequent graph path (614), from an unvisited subset of nodes and edges (i.e., excluding the initial graph cycle (610) and the first subsequent graph path (612)) of the first connected graph (600), is identified. Details concerning the identification of subsequent graph paths are described above with respect to FIG. 5. In this example, assume the nodal path A-H-B is identified to represent the second subsequent graph path (614), where: node A represents the first node (i.e., a node already incorporated into the second connected graph (606)) of the first pair of adjacent nodes; node H represents the second node (i.e., a node not yet incorporated into the second connected graph (606)) of the first pair of adjacent nodes; node B represents the third node (i.e., another node already incorporated into the second connected graph (606)) of the second pair of adjacent nodes; node H also represents the fourth node (i.e., another node not yet incorporated into the second connected graph (606)) of the second pair of adjacent nodes; and node H further represents the inflection node pertinent to the outward and inward traversal paths of the second subsequent graph path (614). At least nodes A and B may be identified based on their respective node degrees, which may be bound by a threshold node degree set for the flooding topology. Following its identification, the second subsequent graph path (614) is subsequently incorporated into the second connected graph (606).

Turning to FIG. 6F, because the second connected graph (606) has yet to absorb all the nodes of the first connected graph (600), a third subsequent graph path (616), from an unvisited subset of nodes and edges (i.e., excluding the initial graph cycle (610), the first subsequent graph path (612), and the second subsequent graph path (614)) of the first connected graph (600), is identified. Details concerning the identification of subsequent graph paths are described above with respect to FIG. 5. In this example, assume the nodal path B-F-C is identified to represent the third subsequent graph path (616), where: node B represents the first node (i.e., a node already incorporated into the second connected graph (606)) of the first pair of adjacent nodes; node F represents the second node (i.e., a node not yet incorporated into the second connected graph (606)) of the first pair of adjacent nodes; node C represents the third node (i.e., another node already incorporated into the second connected graph (606)) of the second pair of adjacent nodes; node F also represents the fourth node (i.e., another node not yet incorporated into the second connected graph (606)) of the second pair of adjacent nodes; and node F further represents the inflection node pertinent to the outward and inward traversal paths of the third subsequent graph path (616). At least nodes B and C may be identified based on their respective node degrees, which may be bound by a threshold node degree set for the flooding topology. Following its identification, the third subsequent graph path (616) is subsequently incorporated into the second connected graph (606).

Turning to FIG. 6G, because the second connected graph (606) has yet to absorb all the nodes of the first connected graph (600), a fourth subsequent graph path (618), from an unvisited subset of nodes and edges (i.e., excluding the initial graph cycle (610), the first subsequent graph path (612), the second subsequent graph path (614), and the third subsequent graph path (616)) of the first connected graph (600), is identified. Details concerning the identification of subsequent graph paths are described above with respect to FIG. 5. In this example, assume the nodal path B-I-A is identified to represent the fourth subsequent graph path (618), where: node B represents the first node (i.e., a node already incorporated into the second connected graph (606)) of the first pair of adjacent nodes; node I represents the second node (i.e., a node not yet incorporated into the second connected graph (606)) of the first pair of adjacent nodes; node A represents the third node (i.e., another node already incorporated into the second connected graph (606)) of the second pair of adjacent nodes; node I also represents the fourth node (i.e., another node not yet incorporated into the second connected graph (606)) of the second pair of adjacent nodes; and node I further represents the inflection node pertinent to the outward and inward traversal paths of the fourth subsequent graph path (618). At least nodes B and A may be identified based on their respective node degrees, which may be bound by a threshold node degree set for the flooding topology. Following its identification, the fourth subsequent graph path (618) is subsequently incorporated into the second connected graph (606).

Figure 6H:
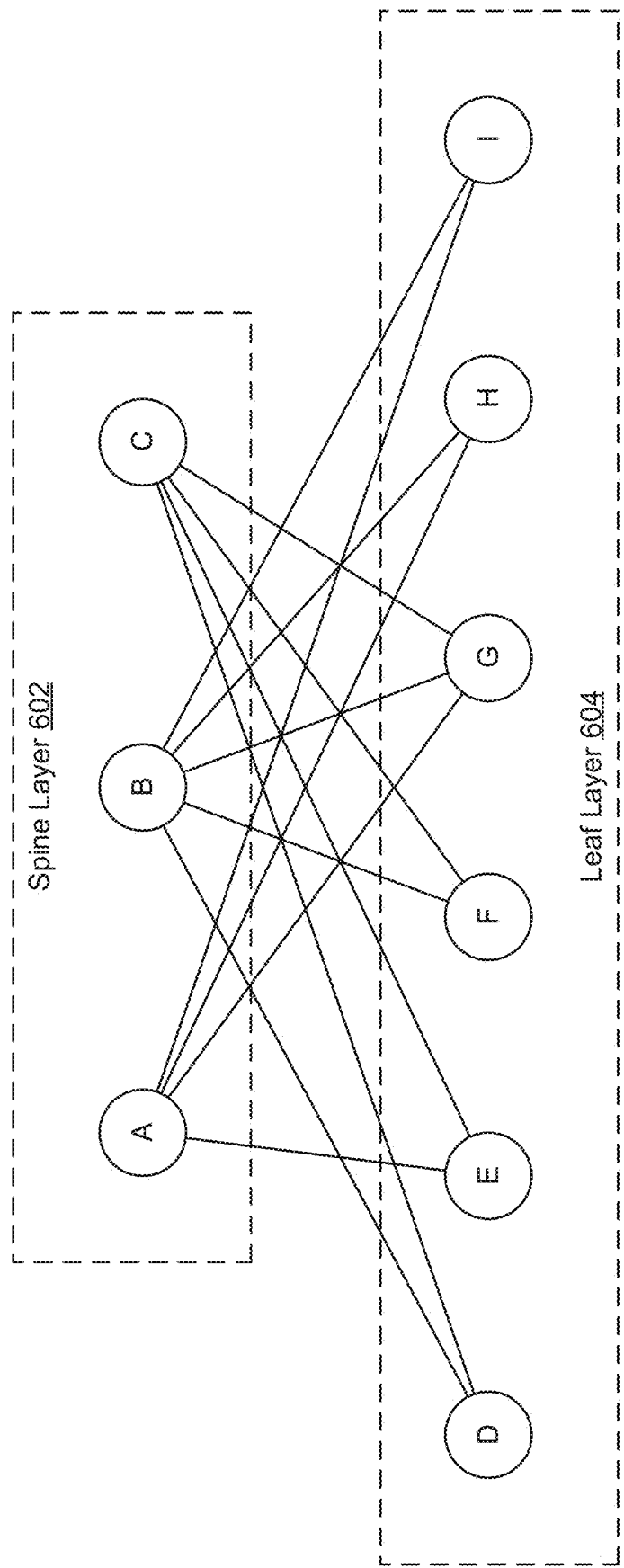

Turning to FIG. 6H, because the second connected graph (606) incorporates all the nodes of the first connected graph (600), computation of the flooding topology (i.e., the second connected graph (606)) terminates. The resulting flooding topology reflects a connected graph that is bi-connected, and includes a second set of edges interconnecting the set of nodes, where the second set of edges includes a subset of the first set of edges interconnecting the set of nodes in the first connected graph (600) (see e.g., FIG. 6A).

While the technology has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method for computing a flooding topology of a network, comprising:

obtaining, by a network device of the network, a first connected graph representing a topology of the network, the first connected graph comprising a set of nodes interconnected by a first set of edges;

selecting, from the set of nodes, a root node to initialize determining a second connected graph that establishes the flooding topology, wherein the second connected graph comprises a second set of edges, the second set of edges being a subset of the first set of edges; and iteratively traversing the first connected graph using an initial graph cycle and a set of subsequent graph paths to form the second connected graph, the second connected graph comprising the set of nodes and the second set of edges, wherein iteratively traversing the first connected graph to form the second connected graph comprises:
identifying the initial graph cycle, wherein the initial graph cycle starts from the root node and returns to the root node, and the initial graph cycle traverses a cyclic path of non-repetitive edges of the first set of edges through nodes of the first connected graph, the cyclic path comprising an outward traversal stage to a threshold depth followed by an inward traversal stage back to the root node;
adding the initial graph cycle to the second connected graph; and
identifying the set of subsequent graph paths, wherein each of the subsequent graph paths comprises at least one node of the second connected graph;
adding the set of subsequent graph paths to the second connected graph.

2. The method of claim 1, wherein the selection of the root node from the set of nodes is based on a node degree of a given node, wherein a node degree of the root node is the largest across the set of nodes of the first connected graph.

3. The method of claim 1, wherein the initial graph cycle comprises the root node and a non-repetitive subset of the set of nodes linked by a non-repetitive subset of the first set of edges, wherein the second connected graph excludes the non-repetitive subset of the set of nodes prior to being updated using the initial graph cycle.

4. The method of claim 1, wherein the outward traversal stage uses a depth first search (DFS) algorithm until the threshold depth is met.

5. The method of claim 1, wherein the inward traversal stage uses a breadth first search (BFS) algorithm.

6. The method of claim 1, wherein identifying the set of subsequent graph paths by iteratively traversing the first connected graph to form the second connected graph, further comprises:

identifying a first pair of nodes adjacent to one another on the first connected graph, wherein the second connected graph comprises a first node of the first pair of nodes and excludes a second node of the first pair of nodes, wherein a first node degree for the first node and a second node degree for the second node are below a node degree threshold;

traversing the first connected graph starting from the first node and ending on a third node of a second pair of nodes adjacent to one another on the first connected graph, the traversing the first connected graph identifying a subsequent graph path of the set of subsequent graph paths, wherein the second connected graph comprises the third node and excludes a fourth node of the second pair of nodes, wherein a third node degree for the third node and a fourth node degree for the fourth node are below the node degree threshold; and updating the second connected graph using the subsequent graph path.

7. The method of claim 6, wherein the subsequent graph path comprises the first node, the third node, and a non-repetitive subset of the set of nodes linked by a non-repetitive subset of the first set of edges, wherein the second connected graph excludes the non-repetitive subset of the set of nodes prior to being updated using the subsequent graph path.

8. The method of claim 1, wherein the second connected graph is bi-connected.

9. A non-transitory computer readable medium (CRM) comprising computer readable program code, which when executed by a computer processor, enables the computer processor to perform a method, the method comprising:
  obtaining, by a network device of the network, a first connected graph representing a topology of the network, the first connected graph comprising a set of nodes interconnected by a first set of edges;
  selecting, from the set of nodes, a root node to initialize determining a second connected graph that establishes a flooding topology, wherein the second connected graph comprises a second set of edges, the second set of edges being a subset of the first set of edges; and
  iteratively traversing the first connected graph using an initial graph cycle and a set of subsequent graph paths to form the second connected graph, the second connected graph comprising the set of nodes and the second set of edges,
  wherein iteratively traversing the first connected graph to form the second connected graph comprises:
    identifying the initial graph cycle, wherein the initial graph cycle starts from the root node and returns to the root node, and the initial graph traverses a cyclic path of non-repetitive edges of the first set of edges through nodes of the first connected graph, the cyclic path comprising an outward traversal stage to a threshold depth followed by an inward traversal stage back to the root node;
    adding the initial graph cycle to the second connected graph;
    identifying the set of subsequent graph paths, wherein each of the subsequent graph paths comprises at least one node of the second connected graph; and
    adding the set of subsequent graph paths to the second connected graph.

10. The non-transitory CRM of claim 9, wherein the selection of the root node from the set of nodes is based on a node degree of a given node, wherein a node degree of the root node is the largest across the set of nodes of the first connected graph.

11. The non-transitory CRM of claim 9, wherein the initial graph cycle comprises the root node and a non-repetitive subset of the set of nodes linked by a non-repetitive subset of the first set of edges, wherein the second connected graph excludes the non-repetitive subset of the set of nodes prior to being updated using the initial graph cycle.

12. The non-transitory CRM of claim 9, wherein the outward traversal stage uses a depth first search (DFS) algorithm until the threshold depth is met.

13. The non-transitory CRM of claim 9, wherein the inward traversal stage uses a breadth first search (BFS) algorithm.

14. A network device comprising:
  a processor programmed to:
  obtain a first connected graph representing a topology of a network, the first connected graph comprising a set of nodes interconnected by a first set of edges;
  select, from the set of nodes, a root node to initialize determining a second connected graph that establishes a flooding topology, wherein the second connected graph comprises a second set of edges, the second set of edges being a subset of the first set of edges; and
  iteratively traverse the first connected graph using an initial graph cycle and a set of subsequent graph paths to form the second connected graph, the second connected graph comprising the set of nodes and the second set of edges,
  wherein iteratively traversing the first connected graph to form the second connected graph comprises:
    identifying the initial graph cycle, wherein the initial graph cycle starts from the root node and returns to the root node, and the initial graph cycle traverses a cyclic path of non-repetitive edges of the first set of edges through nodes of the first connected graph, the cyclic path comprising an outward traversal stage to a threshold depth followed by an inward traversal stage back to the root node;
    adding the initial graph cycle to the second connected graph;
    identifying the set of subsequent graph paths, wherein each of the subsequent graph paths comprises at least one node of the second connected graph; and
    adding the set of subsequent graph paths to the second connected graph.

* * * * *